United States Patent [19]
Chew et al.

[11] Patent Number: 5,889,522
[45] Date of Patent: *Mar. 30, 1999

[54] SYSTEM PROVIDED CHILD WINDOW CONTROLS

[75] Inventors: Chee Heng Chew, Redmond; Neil Konzen, Bellevue; Christopher J. Guzak, Kirkland; Stuart T. Laney, Seattle; George H. Pitt, III, Redmond; Ian M. Ellison-Taylor, Seattle; Ron O. Gery, Kirkland, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 355,400

[22] Filed: Dec. 13, 1994

[51] Int. Cl.$^6$ ............................................ G06F 15/00
[52] U.S. Cl. ..................... 345/354; 345/340; 345/348; 395/683
[58] Field of Search ........................ 395/155, 157, 395/158, 159, 160, 685; 345/348, 349, 352, 353, 354, 340, 341

[56] References Cited

U.S. PATENT DOCUMENTS

| | | | |
|---|---|---|---|
| 5,283,864 | 2/1994 | Knowlton | 395/158 |
| 5,463,724 | 10/1995 | Anderson et al. | 395/159 |
| 5,500,929 | 3/1996 | Dickingson | 395/159 |
| 5,550,563 | 8/1996 | Matheny et al. | 345/168 |
| 5,559,946 | 9/1996 | Porter | 395/157 |

OTHER PUBLICATIONS

"Guide to Programming," Microsoft® Windows™ *3.1*, Microsoft Press, Chapter 8, pp. 164–188, 1992.

*Primary Examiner*—Ba Huynh
*Attorney, Agent, or Firm*—Christensen O'Conner Johnson & Kindness PLLC

[57] ABSTRACT

New varieties of child window controls are provided as system resources that application programs may exploit. The preferred embodiment of the present invention provides a dynamic link library (DLL) for implementing the new child window controls as part of an operating system. The new child window controls include a header bar control for providing header bars in application programs. The new controls also include a hot key control that allows a user to view and edit hot key combinations. The new controls further include a tab control for establishing tabs that differentiate amongst pages in user interfaces provided by application programs. An image list data type is defined and functions are provided for manipulating the image list data type. Image lists include multiple like-sized images that are stored efficiently in a single bitmap.

13 Claims, 20 Drawing Sheets

SYSTEM PROVIDED CHILD WINDOW CONTROLS

TECHNICAL FIELD

The present invention relates generally to data processing systems and, more particularly, to child window controls.

BACKGROUND OF THE INVENTION

The "MICROSOFT" WINDOWS, Version 3.1, operating system sold by Microsoft Corporation of Redmond, Wash., provides application developers with child window controls that they may integrate into their applications. Unfortunately, the number of controls that are provided by the operating system and the range of functionality provided by the controls are not sufficient for all applications. As a result, application developers have been forced to create their own child window controls.

SUMMARY OF THE INVENTION

In accordance with a first aspect of the present invention, a method is practiced in a computer system that has an input device, a video display and a processor that runs at least one application program. In accordance with the method of this aspect of the present invention, code for implementing a new child window control is provided as a system resource that the application program may use. The code may be for implementing a header bar control that is a multi-piece child window control that displays headers as a bar. Alternatively, the code may be for implementing a tab control. The tab control displays tabs for differentiating pages that are to be displayed by the application program. Furthermore, the code may be for a hot key control that allows a user to edit and view a key combination that constitutes a hot key. The hot key invokes activity in the application program. A system resource is then used to display the associated control.

In accordance with another aspect of the present invention, an image list data type is provided for an image list. Each image list is an indexed list of bitmaps. An image list is provided that is of the image list data type, and an image in the provided image list is displayed on the video display.

DETAILED DESCRIPTION OF THE INVENTION

The preferred embodiment of the present invention provides new child window controls as part of an operating system. These child window controls may be utilized by application programs that run on the operating system. The new child window controls include a header bar control, a hot key control and tab controls. These new child window controls will be described in more detail below.

Figure 1:
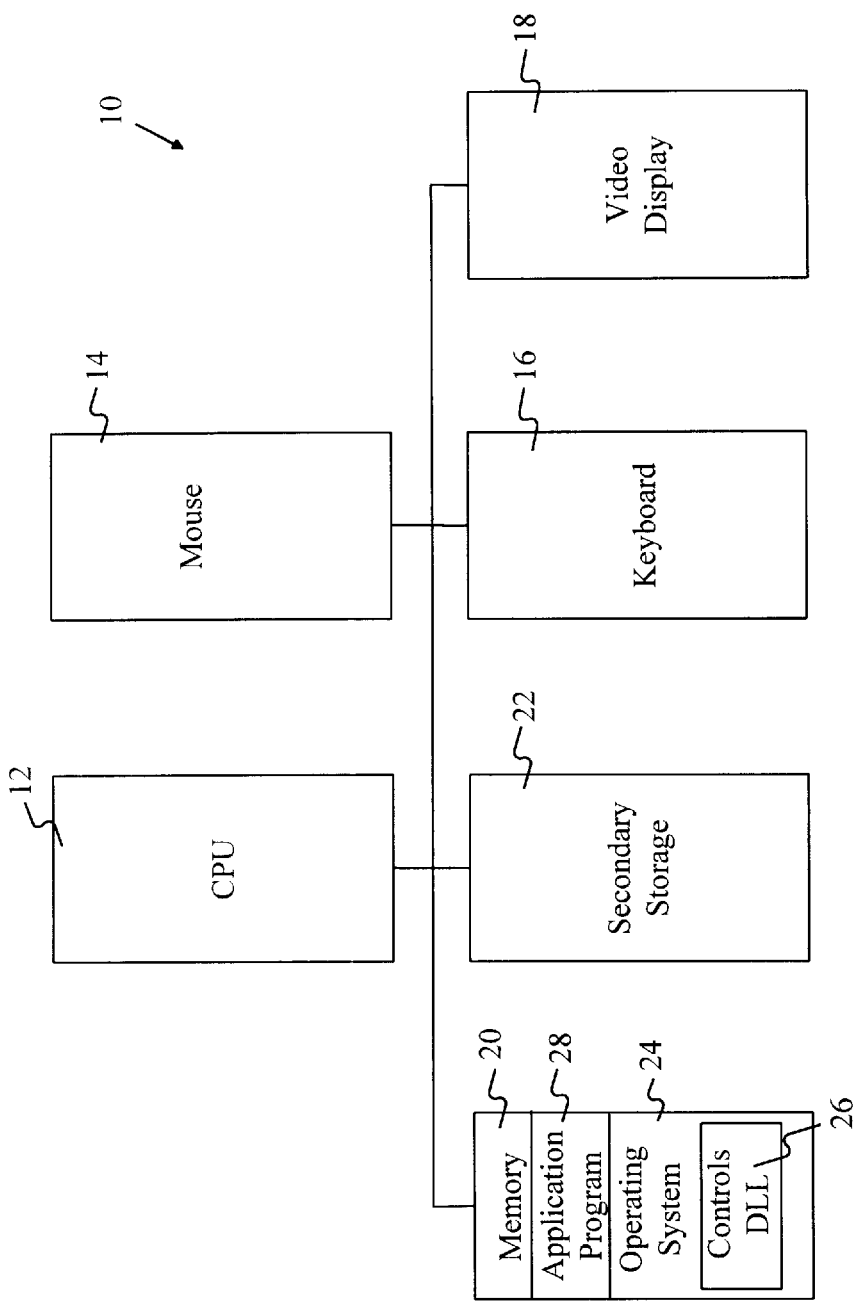
FIG. 1 is a block diagram of a computer system that is suitable for practicing the preferred embodiment of the present invention.

FIG. 1 is a block diagram of a computer system that is suitable for practicing the preferred embodiment of the present invention. Those skilled in the art will appreciate the computer system 10 shown in FIG. 1 is intended to be merely illustrative and that the present invention may be practiced in other computer systems that have different configurations. The computer system 10 of FIG. 1 includes a central processing unit (CPU) 12 that has access to a number of peripheral devices, including a mouse 14, a keyboard 16 and a video display 18. The CPU also has access to a memory 20 and a secondary storage 22.

The secondary storage 22 may be any of a number of different types of secondary storage devices, including a hard disk storage device. Memory 16 holds a copy of an operating system 24. The new child window controls provided by the preferred embodiment of the present invention are implemented as part of the operating system in a controls dynamic link library (DLL) 26 that contains code, structures and messages for implementing the new child window controls. Those skilled in the art will appreciate that the controls DLL 26 may also include the necessary code, structures and messages for implementing additional child window controls. Those skilled in the art will also appreciate that the present invention need not be implemented through a DLL. Further, the present invention need not be implemented as part of an operating system but rather may be implemented as a separate system resource. The memory 16 also holds one or more application programs 28.

Child window controls are child windows that reside within parent windows. The child windows send notification messages to the parent windows when events occur. For example, when user input is received in a child window, the child window sends the input to the parent window. One of the primary uses of child window controls is to process mouse and keyboard messages so that the child window acts as a kind of input device for the parent window.

For purposes of the discussion below, it is assumed that the operating system 24 is the "MICROSOFT" WINDOWS 95 operating system, sold by Microsoft Corporation of Redmond, Wash. This operating system 24 is a windows-based operating system. Windows are created based upon a window class. The window class identifies a window procedure that processes messages that are sent to the window. The operating system 24 supports a RegisterClass( ) function that enables an application to register a window class. The window procedure for a window is the function that receives and processes messages that are sent to the window. The operating system 24 is a message-based operating system such that operations are achieved by passing messages between windows. As will become more apparent in the discussion below, applications 28 communicate with child window controls by sending the child window controls messages and by receiving notifications from the child window controls.

An application 28 utilizes a child window control by incorporating a child window control into a parent window that the application provides. The controls DLL 26 is a library that has functions which may be called by the application programs to control the appearance of the child window control and to perform the actions with respect to the child window control.

Figure 2:
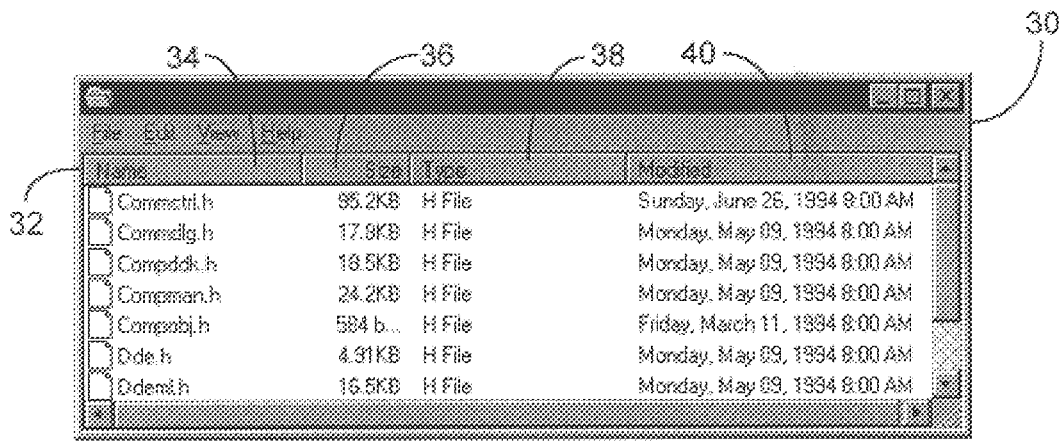
FIG. 2 is a diagram illustrating an example header bar control that is generated in accordance with the preferred embodiment of the present invention.

A header bar control is a window that is typically positioned as a header for columns or rows of information. Typically, a header bar is a multi-piece window, wherein each piece includes text and may include an image. FIG. 2 shows an example of a header bar control 32 for a window 30 that contains a listing of files in a directory. The header bar control is divided into a name part 34, a size part 36, a type part 38 and a modified part 40. The header bar provides headers for the columns that are positioned beneath the pieces of the header bar. The example shown in FIG. 2 depicts a horizontally-oriented header bar. Those skilled in the art will appreciate that header bars may also be oriented vertically to serve as headers for rows.

Figure 3:
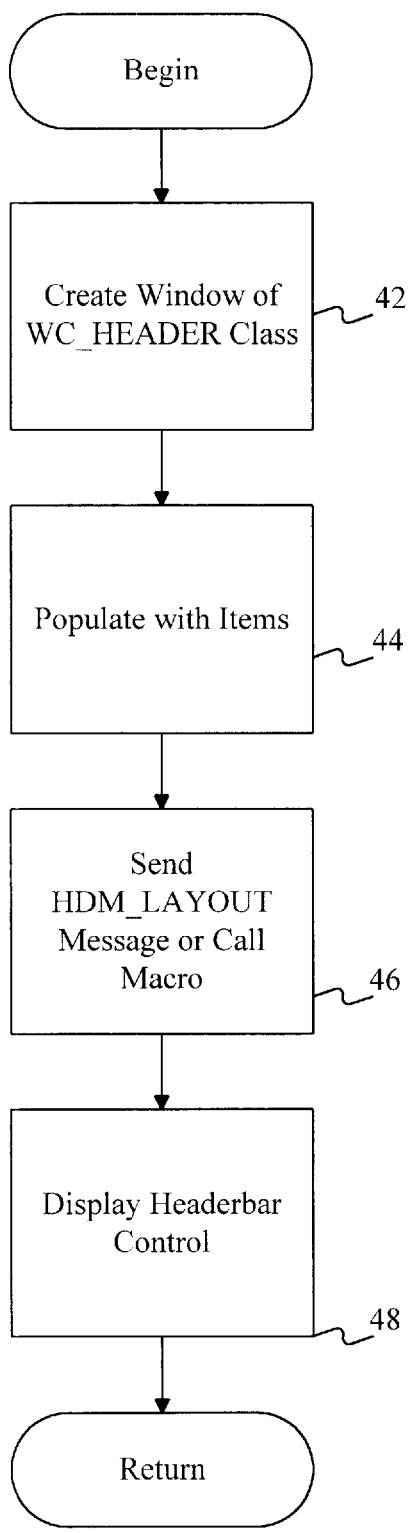
FIG. 3 is a flowchart illustrating the steps that are performed to use a header bar control in the preferred embodiment of the present invention.

FIG. 3 is a flowchart that shows the steps that are performed to create and display a header bar control. Initially, an application creates a window of the WC_HEADER windows class (step 42). This window class is the predefined windows class that is registered for header bar controls by the controls DLL 26 (FIG. 1). The control then must be populated with items (step 44 in FIG. 3). This achieved by adding items to the header bar control.

Figure 4:
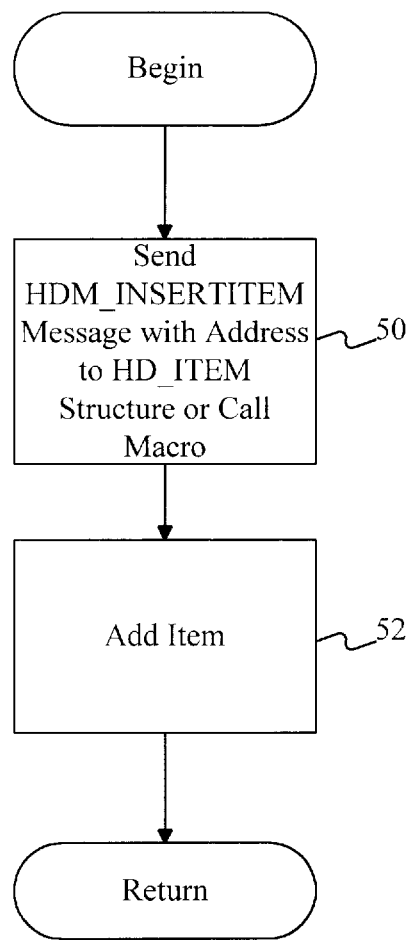
FIG. 4 is a flowchart illustrating the steps that are performed to add items to a header bar control in accordance with the preferred embodiment of the present invention.

FIG. 4 shows in more detail how items are added to the header bar control. In particular, a predefined message, HDM_INSERTITEM message is sent to the window procedure that is responsible for the header bar control. Alternatively, a macro function may be called to achieve the same effect as the message. In either case, the address to an HD_ITEM structure is passed as a parameter (step 50 in FIG. 4). This structure has the following format.

```
typedef struc_HD_ITEM                { hdi
    UINT            mask;
    int             cxy;
    LPSTR           pszText;
    HBITMAP         hbm;
    int             cchTextMax;
    int             fmt;
    LPARAM          lParam;
} HD_ITEM;
```

The mask field of the HD_ITEM structure holds flags that indicate which of the other field in the structure contain valid data. The cxy field holds a value that specifies the width or height of the item. If the header bar is oriented horizontally, the cxy field holds a value that specifies the width of the item. On the other hand, if the header bar control is oriented vertically, the cxy field holds a value that specifies the height of the item. The pszText field holds an address to the memory location that holds the string that is to be displayed in the piece of the header bar that is associated with the item. The hbm field holds a handle to an optional bitmap that may be displayed for the item on the header bar. The cchTextMax identifies the length of the item string in characters. The item string was discussed above relative to the psztext field. The fmt field holds format flags that identify whether the contents of the item should be center aligned, left aligned or right aligned. It also specifies whether the item is a bitmap, string or owner drawn. Lastly, the lParam field is a field that is reserved for holding application defined item data.

Thus, in order to add an item, a HD_ITEM structure is defined for an item and the address of the structure is passed in the HDM_INSERT item message or in the corresponding macro call to the header bar control. The header bar control uses this information to add the item to the control (step 52 in FIG. 4).

In step 44 of FIG. 3, items are added to the header bar control by following the steps described above. For instance, for the example header bar shown in FIG. 2, a name item, a size item, a type item and a modified item must be added to the header bar control. Separate HD_ITEM structures must be defined for each of these items. No optional bitmaps are displayed within the pieces of the header bar that are show in FIG. 2.

An application may specify styles for the header items. The HDS_BUTTONS style makes each item in the header bar control look and behave as if it is a push button. Thus, the user may use the mouse 14 to push the various items shown on the header bar control. It is the responsibility of the application to determine what action to perform when a user clicks on one of the items in the header bar control. The header bar control merely informs the application that the item has been clicked on. The HDS_HORZ style creates a header control with a horizontal orientation, whereas the HDS_VERT style creates a header bar control with a vertical orientation.

In order to display the header bar control, the size and position of the header bar control must be determined. The application program sends in a HDM_LAYOUT message to the header bar control or calls the corresponding macro and passes an address of an HD_LAYOUT structure that contains the coordinates of the rectangle that the header control is to occupy. Further, a pointer to a window POS structure is passed by the message or macro call (step 46).

The HDMLAYOUT structure has the following format.

```
typedef struct _HD_LAYOUT        {   //  hdl
       RECT FAR* prc;
       WINDOWPOS FAR* pwpos;
}      HD_LAYOUT;
```

The prc field holds a pointer to a bounding rectangle structure that contains the coordinates of a rectangle in which the header control is to be drawn. The pwpos field holds a pointer to the WINDOWPOS structure. The WINDOWPOS structure is a standard structure defined by the operating system that defines where the window is to be positioned within a given bounding rectangle. Hence, in step 48, the header bar control is displayed using the HD_LAYOUT and WINDOWPOS structures.

Figure 5:
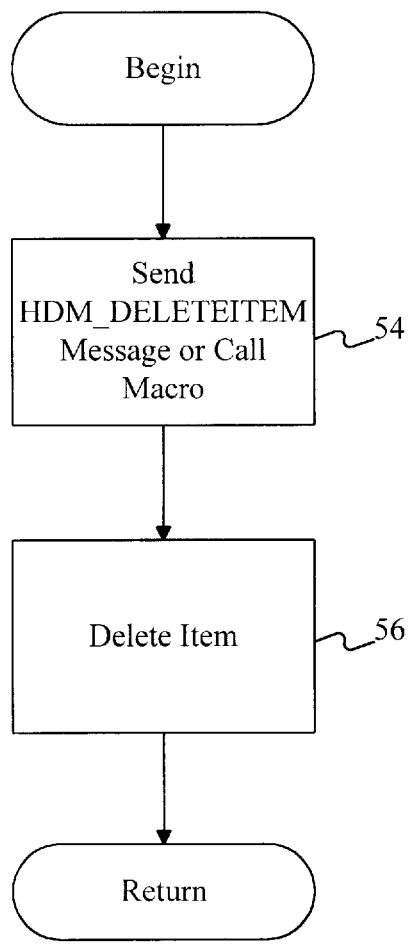
FIG. 5 is a flowchart illustrating the steps that are performed to delete items from a header bar control in accordance with the preferred embodiment of the present invention.

The above discussion has noted that items may be added to a header bar control. It should be appreciated that items may also deleted from header bar controls. FIG. 5 is a flowchart illustrating the steps that are performed to delete an item from the header bar control. An application sends a HDM_DELETEITEM item message to the child window control or calls the corresponding macro (step 54 in FIG. 5). In response to receiving the message or the macro call, the child window control deletes the item so that it is no longer displayed.

Figure 6:
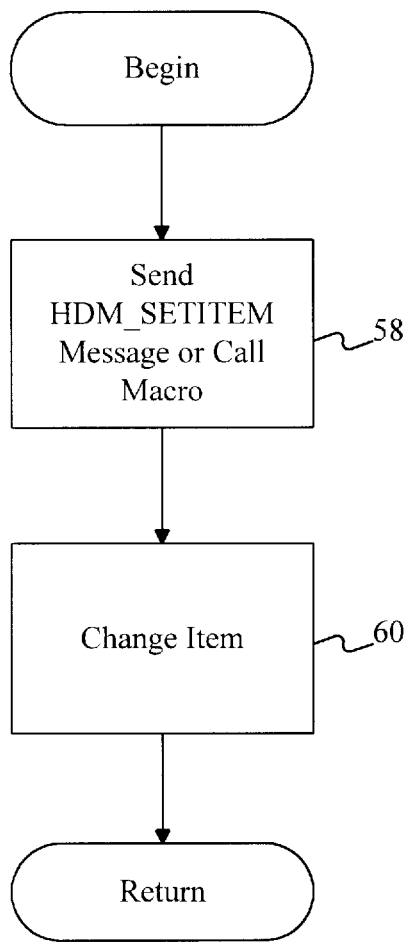
FIG. 6 is a flowchart illustrating the steps that are performed to change items in a header bar control in the preferred embodiment of the present invention.

An application may also change the values that are set for an item within a header bar control. In order to do this, an application sends an HDM_SETITEM message to the header bar control or calls the corresponding macro (step 58). The HDM_SETITEM message or the macro call includes a handle to the header bar control and an index of the item whose attributes are to be changed. The address of an HD_ITEMSTRUCTURE is also passed. The mask field of this structure indicates which attributes are to be set. Other fields specify new attributes. The header bar control receives the message or the macro call and changes the item accordingly (step 60 in FIG. 6).

Individual items of the header control can be defined to be owner drawn items. To specify an item as an owner drawn item, the fmt format field should be set to specify that the item is to be owner drawn. When the header bar control must draw an owner drawn item, it sends a WM_DRAWITEM message to the parent window. The message includes a parameter that identifies the header bar control and also includes a parameter to a structure that the parent window may use to draw the item.

As was discussed above, a header bar control sends a notification message to its parents when a user clicks on an item, double clicks on an item, drags an item divider, changes the attributes of an item. These notifications are sent as WM_NOTIFY messages. The following is a list of notification messages and a brief description of them.

| Notification | Description |
| --- | --- |
| HDN_BEGINTRACK | Signals the start of divider dragging. |
| HDN_DIVIDERDBLCLICK | Indicates that the user double-clicked a divider. |
| HDN_ENDTRACK | Signals the end of divider dragging. |
| HDN_ITEMCHANGED | Indicates a change in the attributes of an item. |
| HDN_ITEMCHANGING | Indicates that the attributes of an item are about to change. |
| HDN_ITEMCLICK | Indicates that the user clicked an item. |
| HDN_TRACK | Indicts that the user dragged a divider. |

When a divider that separates items is being dragged, the header bar control sends an HDN_TRACK notification message and redraws itself based upon where the user drops the border. Thus, a user may adjust the size of the item as the user sees fit.

Figure 7:
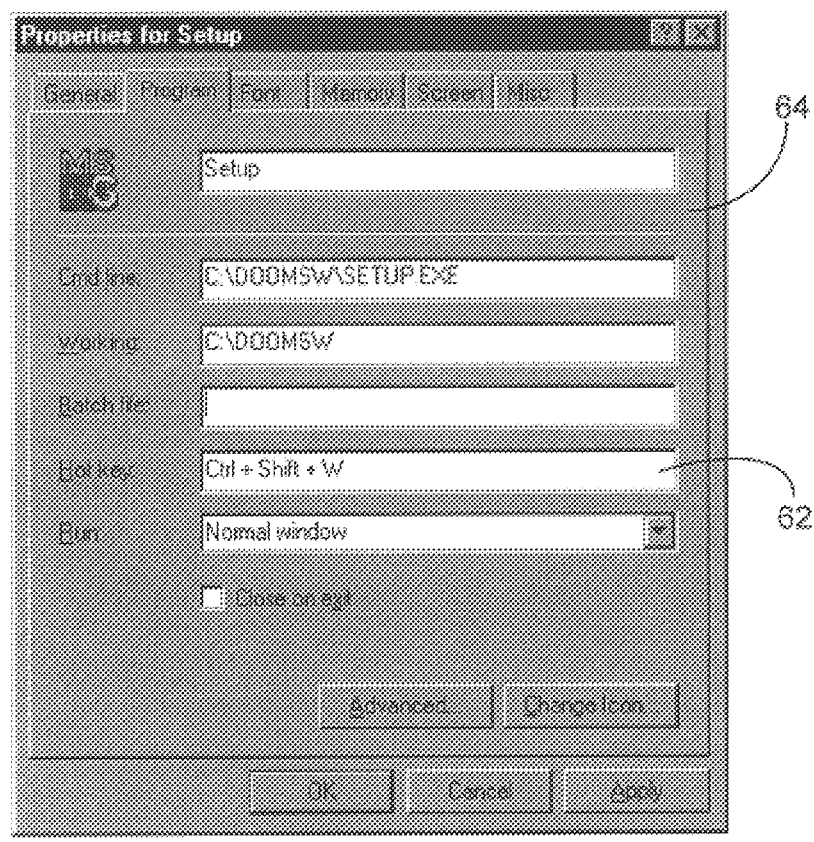
FIG. 7 is a diagram that illustrates the use of a hot key control in accordance with the preferred embodiment of the present invention.

The preferred embodiment of the present invention also provides hot key controls. A hot key control is a window that enables a user to create a hot key. A hot key is a key combination that the user may press to perform an action quickly. For example, a user may create a hot key that activates a window and brings the window to the top of the windows currently being displayed (i.e., to the top of the Z order). The hot key control displays a user's choice of a hot key combination and ensures that the user selects a valid hot key combination. FIG. 7 shows an example of a hot key control 62 that is displayed on a property sheet for a setup program. For the example shown in FIG. 7, the hot key combination is a control key+shift key+W key combination.

Figure 8:
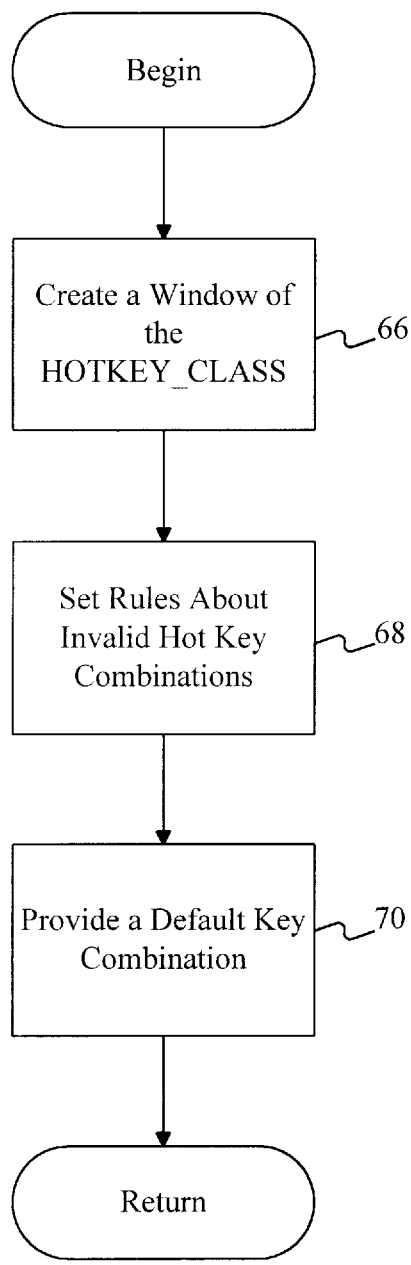
FIG. 8 is a flowchart illustrating the steps that are performed to create a hot key control in accordance with the preferred embodiment of the present invention.

An application creates a hot key control by performing the steps illustrated in the flowchart of FIG. 8. Initially, an application program creates a window of the HOTKEY_CLASS window class (step 66 in FIG. 8). The HOTKEY_CLASS window class is registered by the controls DLL 26 (FIG. 1). The application may create a window of this class by calling the CreateWindowEx( ) function as defined by the "MICROSOFT" WIN32 API. This function returns a handle (i.e., a unique numerical identifier) to the hot key control.

The application may then desire to set some rules about invalid hot key combinations (step 68). Those skilled in the art will appreciate that this step is optional and at the discretion of the application. An application sets rules for invalid hot key combinations by performing the steps shown in the flowchart of FIG. 9. The application sends a HKM_SETRULES message or calls a corresponding macro (step 72 in FIG. 9). The message or macro call contains two parameters. The first of these parameters is an array of flags that specifies invalid key combinations. This array of flags may be any combination of the following values.

| | |
|---|---|
| HKCOMB_A | ALT |
| HKCOMB_C | CTRL |
| HKCOMB_CA | CTRL+ALT |
| HKCOMB_NONE | Unmodified keys |
| HKCOMB_S | SHIFT |
| HKCOMB_SA | SHIFT+ALT |
| HKCOMB_SC | SHIFT+CTRL |
| HKCOMB_SCA | SHIFT+CTRL+ALT |

The second parameter passed in the message or macro call is an array of flags that specify modifier key combinations that are to be used when the user enters an invalid combination. These flags can be a combination of any of the following values.

| | |
|---|---|
| HOTKEYF_CONTROL | CTRL key |
| HOTKEYF_EXT | Extended key |
| HOTKEYF_SHIFT | SHIFT key |
| HOTKEYF_ALT | ALT key |

The modifier keys replace the invalid keys that are entered.

Figure 9:
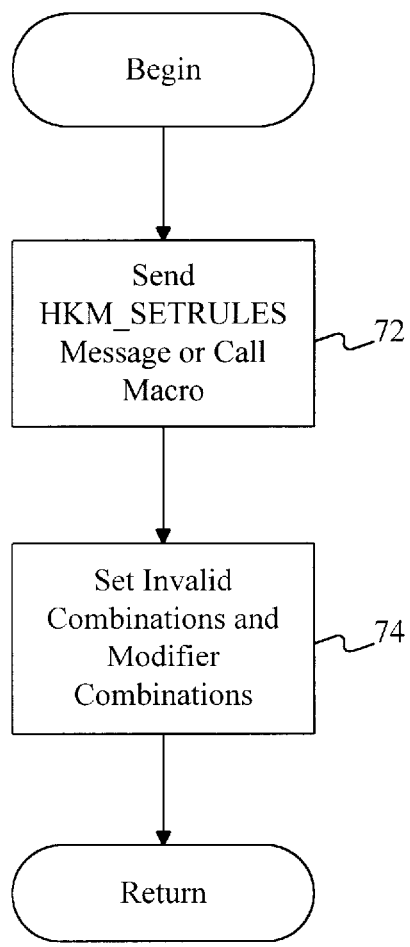
FIG. 9 is a flowchart illustrating the steps that are performed to set rules regarding invalid key combinations and to provide modifier combinations for hot key controls in the preferred embodiment of the present invention.

After the hot key control receives the HKM_SETRULES message or the corresponding macro is called, the hot key control sets invalid hot key combinations and sets the appropriate modifier combination (step 74 in FIG. 9).

Figure 10:
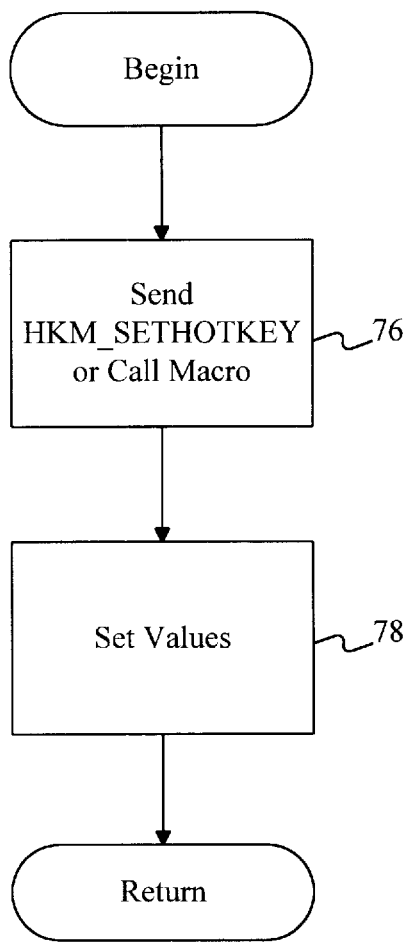
FIG. 10 is a flowchart illustrating the steps that are performed to set a key combination for a hot key control in accordance with the preferred embodiment of the present invention.

An application may also specify a default hot key combination that is to be used if the user does not provide a hot key combination (step 70 in FIG. 8). These default key combinations are provided by sending the HKM_SETHOTKEY message or calling a corresponding macro. FIG. 10 is a flowchart illustrating the steps that are performed to set such hot key values (either default or otherwise). In step 76, the application sends the HKM_SETHOTKEY message or calls the corresponding macro. This message includes two parameters. A first of the parameters specifies a virtual key code for the hot key. The second parameter specifies modifier flags that indicate keys which, when used in combination with the key defined by the first parameter, define a hot key combination. The hot key control uses these parameters to set the appropriate hot key combination value (step 78 in FIG. 10).

After a hot key combination has been established and a hot key control has been created, a WM_SETHOTKEY windows message may be sent by an application to the operating system 24 to set up a hot key in the system. The virtual key code of the hot key is passed as a parameter to this message. Those skilled in the art will appreciate that this is merely an illustrative case and is not intended to be limiting of the present invention.

Whenever a user presses the hot key after the hot key has been set up in the system, a window of the application receives a WM_SYSCOMMAND message that specifies the hot key virtual key code. This message causes the window to be activated and the application then responds to the hot key.

Figure 11:
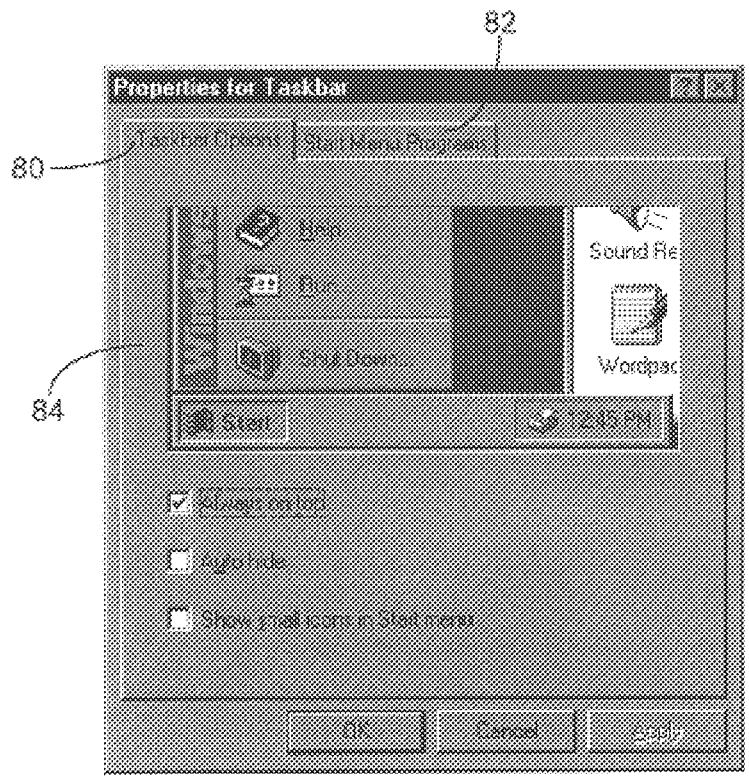
FIG. 11 is a diagram illustrating tabs that are provided by a tab control in the preferred embodiment of the present invention.

The preferred embodiment of the present invention also provides tab controls. Tab controls are child window controls that analogous to dividers like those found in a notebook or to labels found in a file cabinet. By using a tab control, an application program 28 may define multiple pages for the same area of a window or a dialog box. Each page includes a set of information or a group of controls that the application displays when the user selects the corresponding tab. FIG. 11 shows an example of tab controls 80 and 82 that are shown for property sheets. Tab control 80 is associated with and used to select property sheet page 84.

Figure 12:
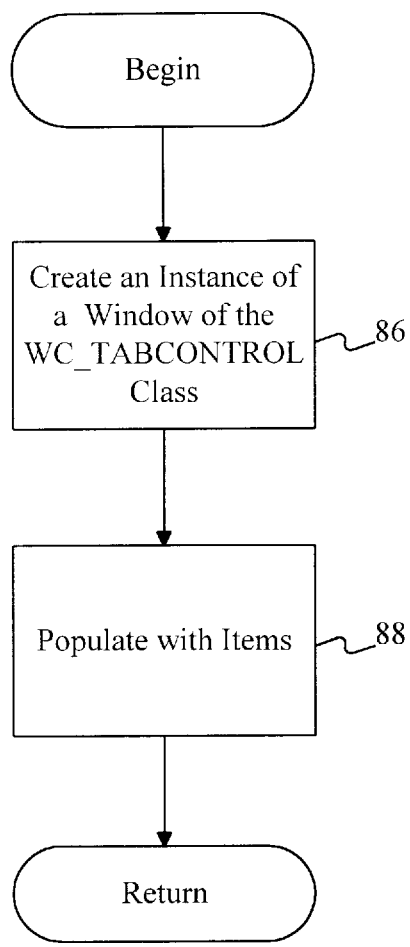
FIG. 12 is a flowchart illustrating the steps that are performed to create a tab control in accordance with the preferred embodiment of the present invention.

FIG. 12 is a flowchart illustrating the steps that are performed to create a tab control. First, an application program creates an instance of a window of the WC_TABCONTROL window class. The application program may create a window of this class by calling the CreateWindow( ) function or the CreateWindowEx( ) function of the "MICROSOFT" WIN32 API. The application program then must populate the control with items (step 88). Each tab is associated with a corresponding item.

Figure 13:
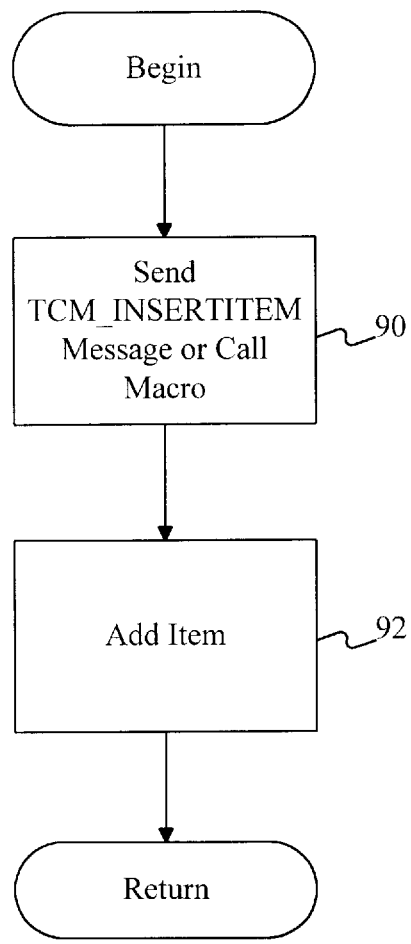
FIG. 13 is a flowchart illustrating the steps that are performed to add items to a tab control in the preferred embodiment of the present invention.

FIG. 13 is a flowchart illustrating the steps that are performed to add items to a tab control. An application may add an item to a tab control by sending a TCM_INSERTITEM message or calling a corresponding macro (step 90 in FIG. 13). This message or the corresponding macro call includes a parameter that identifies a TC_ITEM data structure that has the following format.

```
typedef struct _TC_ITEM {
    UINT mask;
    UINT lpReserved1;
    UINT lpReserved2;
    LPSTR pszText;
    int cchTextMax;
    int iImage;
    LPARAM lParam;
} TC_ITEM
```

The mask field of the structure holds a value that specifies which fields are to be set. The lpReserved1 and lpReserved2 fields are not currently used. The pszText field holds a pointer to a memory location that holds a text string that is to be displayed on the corresponding tab. The cchTextMax field holds a value that specifies the size of the buffer that is pointed to by the pszText field. The iImage field is an index into a tab control image list or a value of −1 that specifies there is no image for the tab. Image lists will be described in more detail below, but for current purposes, it suffices to note that image lists contain an indexed list of images that are logically grouped together. The lParam field points to application defined data that is associated with the tab.

The tab control receives the message or macro call and the address of the associated TC_ITEM structure. The tab control then adds the item (step 92 in FIG. 13). For example, tab control is shown in FIG. 11, separate items must be provided for the "TaskBarOptions" tab 80 and the "StartMenuPrograms" tab 82.

An application may control the characteristics of tab controls by specifying tab control styles. The following tab control styles are defined.

| | |
|---|---|
| TCS_BUTTONS | Specifies that tabs appear as buttons and no border is drawn around the display area. |

-continued

| | |
|---|---|
| TCS_FIXED WIDTH | Specifies that all tabs are the same width. This style cannot be combined with the TCS_RIGHTJUSTIFY style. |
| TCS_FOCUSNEVER | Specifies that the tab control never receives the input focus. |
| TCS_FOCUSONBUTTONDOWN | Specifies that tabs receive the input focus when clicked. |
| TCS_FORCEICONLEFT | Aligns icons with the left edge of each fixed-width tab. This style can only be used with the TCS_FIXEDWIDTH style. |
| TCS_FORCELABELLEFT | Aligns labels with the left edge of each fixed width tab (that is, it displays the label immediately to the right of the icon instead of centering it). This style can only be used with the TCS_FIXEDWIDTH style, and it implies the TCS_FORCEICONLEFT style. |
| TCS_MULTILINE | Displays multiple rows of tabs, if necessary, so that all tabs are visible at once. |
| TCS_OWNERDRAWFIXED | Specifies that the parent window is responsible for drawing tabs. |
| TCS_RAGGEDRIGHT | Does not stretch each row of tabs to fill the entire width of the control. This style is the default. |
| TCS_RIGHTJUSTIFY | Increases the width of each tab, if necessary, such that each row of tabs fills the entire width of the tab control. This window style is ignored unless the TCS_MULTILINE style is also specified. |
| TCS_SHAREIMAGELISTS | Does not destroy the image list when the control is destroyed, so that the same image list can be assigned to multiple tab controls. |
| TCS_SINGLELINE | Displays only one row of tabs. The user can scroll to see more tabs, if necessary. This style is the default. |
| TCS_TABS | Tabs appear as tabs, and a border is drawn around the display area. This style is the default. |
| TCS_TOOLTIPS | The tab control has a tool tip control associated with it. |

Figure 14:
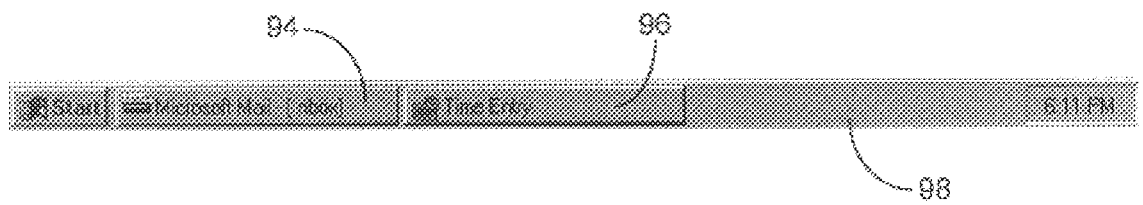
FIG. 14 is a diagram illustrating the TCS_BUTTONS style for a tab control in accordance with the preferred embodiment of the present invention.

The TCS_BUTTONS style may be selected so that the tabs appear like buttons. FIG. 14 shows an example wherein tabs 94 and 96 on the task bar appear like buttons. These buttons and the task bar are described in more detail in co-pending application entitled "Taskbar with Start Menu", Ser. No. 08/572,725, now U.S. Pat. No. 5,757,371, which is a continuation of U.S. Ser. No. 08/478,490, now abandoned, which is a continuation of U.S. Ser. No. 08/354,917, now abandoned, which is assigned to a common assignee with the present application and which was filed on even date herewith.

An application can specify that a tab receives the input focus when the tab is clicked on using the mouse 14 by specifying the TCS_FOCUSONBUTTONDOWN style. An application may also specify that a tab never receives the input focus by using the TCS_FOCUSNEVER style.

By default, a tab control displays all tabs in one row. If the tab control cannot display all the tabs at once, the tab control displays an up/down control so the user can scroll the additional tabs into view. An application can cause a tab control to display multiple rows of tabs by specifying the TCS_MULTILINE style.

Tabs are generally left aligned within a row. An application may, however, specify the TCS_RIGHTJUSTIFY style. A tab control automatically sizes each tab to fit its icon and label. To ensure that all tabs have the same width, an application may specify the TCS_FIXEDWIDTH style. An application may assign a specific width and height by using the TCM_SETITEMSIZE message. This message passes the width and height of a tab as a parameter.

Within each tab, the tab control centers any icon and labels the icon to the left of the label. An icon may be forced to the left, leaving the label centered, by specifying the TCS_FORCEICONLEFT style. An application may left align both the icon and label by using the TCS_FORCELABELLEFT style. An application may specify that the parent window draws tabs in the tab control by selecting the TCS_OWNERDRAWFIXED style. Lastly, an application may specify that a tab control creates a tool tip control by specifying the TCS_TOOLTIPS style.

Figure 15:
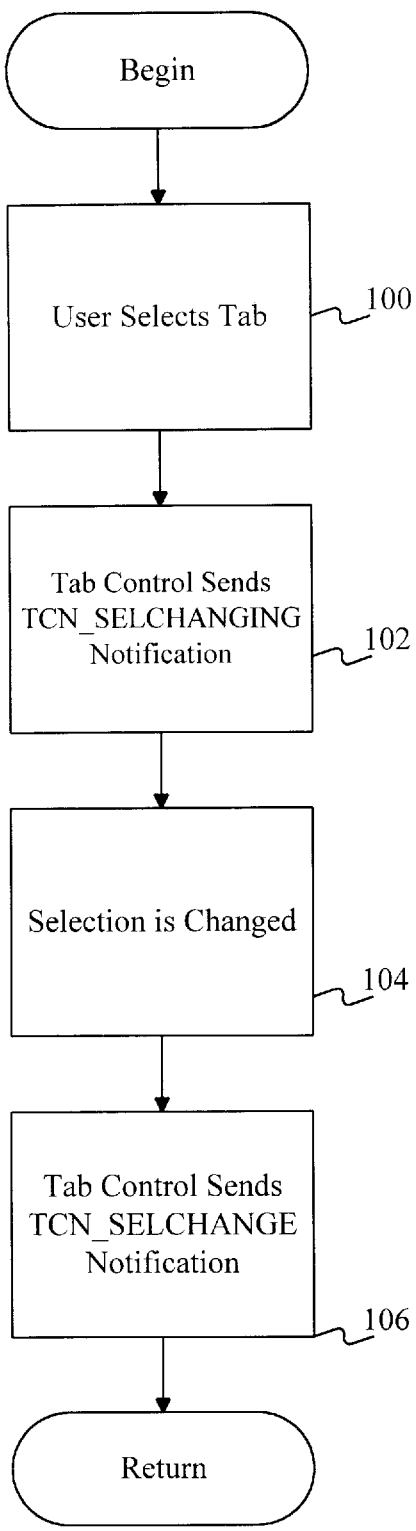
FIG. 15 is a flowchart illustrating the steps that are performed when a user selects a tab in a tab control per the preferred embodiment of the present invention.

FIG. 15 is a flowchart showing the steps that are performed when a user selects a tab. In step 100, the user selects the tab. Typically, the user selects a tab by positioning a mouse cursor to point at the tab and then clicking a designated mouse button on the mouse 14. In response to the selection, the tab control sends a TCN_SELCHANGING notification message if the tab is different from the tab that currently has focus (step 102). The selection is then changed (step 104) and a TCN_SELCHANGE notification message is sent to the application (step 106). The application processes the TCN_SELCHANGE notification message to display the appropriate incoming page in the display area.

Figure 16:
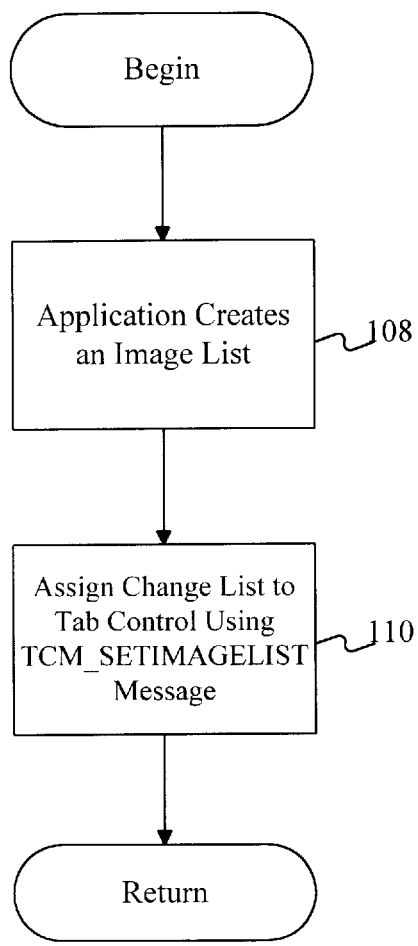
FIG. 16 is a flowchart illustrating the steps that are performed to use an image list with a tab control in accordance with the preferred embodiment of the present invention.

As was discussed above, each tab may have an icon associated with it. This icon is specified by an index into an image list that is associated with the tab control. FIG. 16 is a flowchart of the steps that are performed to associate an image list with a tab control. Initially, the application creates an image list using functions provided by the operating system 24, which will be described in more detail below (step 108). The image list is then assigned to the tab control by sending the TCM_SETIMAGELIST message from the application to the tab control (step 110).

Figure 17:
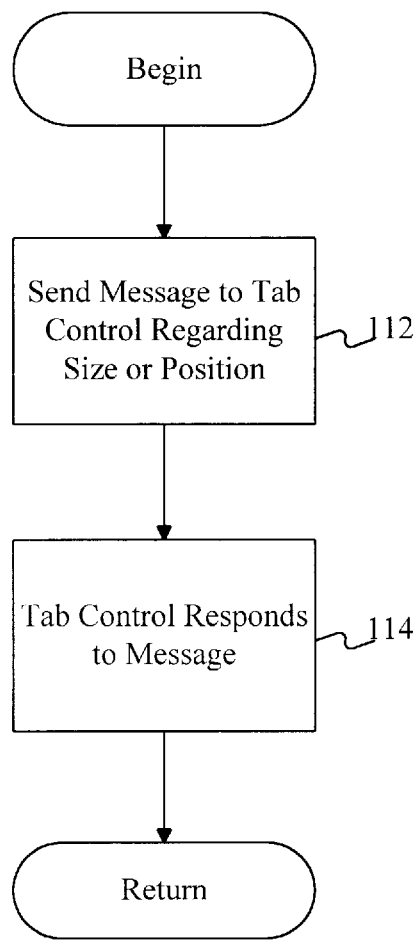
FIG. 17 is a flowchart illustrating the steps that are performed to adjust the size and position of a tab control in accordance with the preferred embodiment of the present invention.

The size and position of each tab in a tab control may be manipulated. FIG. 17 shows the steps that are performed to manipulate the size and position of the tab control. A message is sent to the tab control regarding size and position (step 112). The tab control then responds to this message to manipulate the size or position of the tab (step 114). For example, as was discussed above, the exact width and height of tabs may be set by sending the TCM_SETITEMSIZE message from the application to the tab control. The thickness of the margin for tab controls may be set by sending a TCM_SETPADDING message from the application to the tab control. The horizontal and vertical padding are passed as parameters to this message. In addition, the current bounding rectangle for a tab may be determined by sending the TCM_GETITEMRECT message to the tab control.

As was discussed above relative to the TCS_OWNERDRAWFIXED style, a tab control may be established that requires the parent window to print tabs. When a tab control needs to paint a tab and this style is set, the tab control sends a WM_DRAWITEM windows message. One of the parameters that this message specifies is a data structure that contains the index of the tab, its bounding rectangle and a device context in which to draw the tab.

Figure 18:
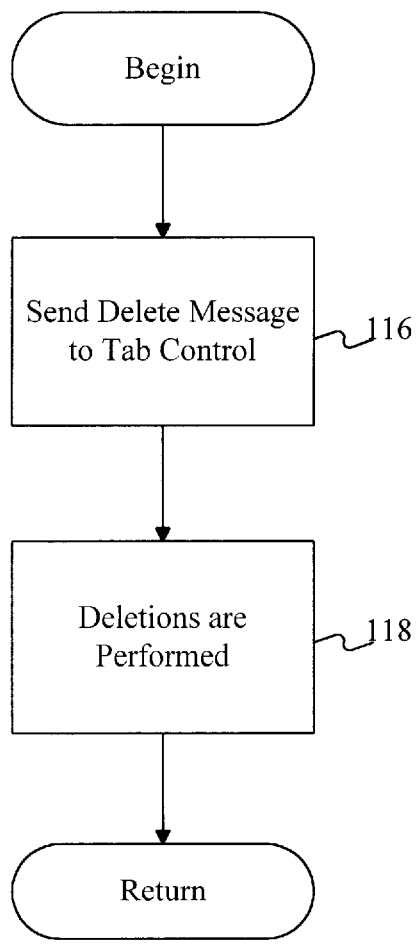
FIG. 18 is a flowchart illustrating the steps that are performed to delete an item from the tab control in accordance with the preferred embodiment of the present invention.

Tabs for tab controls may be deleted. FIG. 18 is a flowchart illustrating the steps that are performed to delete tabs. First, a delete message is sent from an application to a tab control (step 116 in FIG. 18). The message may be a TCM_DELETEITEM message that includes an index to the item that is to be deleted or may be a TCM_DELETEALLITEMS message for deleting all of the items in a tab control. The tab control receives these messages and then performs the requested deletions (step 118).

An application may adjust the window rectangle that corresponds to a tab control's display area by sending a TCM_ADJUSTRECT message. This message passes the handle of a tab control as a parameter. A second parameter may assume a first value that indicates that a third parameter specifies a display rectangle and receives a corresponding window rectangle or, alternatively, specifies a window rectangle and receives a corresponding display area. The third parameter specifies the address of a RECT structure that specifies a given rectangle in which tab control is to be displayed.

A tab control notifies an application of mouse and keyboard events that occur on tabs that are provided by the tab control. The tab control notifies an application of a key event by sending a TCN_KEYDOWN notification message that is sent in the form of a WM_NOTIFY windows message and includes the address of a TC_KEYDOWN structure. This structure includes a virtual key code for the key that was depressed.

As was discussed above, the preferred embodiment of the present invention supports the use of image lists. An image list is a collection of same-sized images that are individually referenceable by an index. All images in an image list are contained in the single wide bitmap in screen device format. An image list may also include a monochrome bitmap that contains masks used to draw images transparently. In particular, there are two types of image lists: non-masked and masked. A non-masked image list includes a color bitmap that contains one or more images. On the other hand, a masked image list includes two bitmaps of equal size. The first bitmap is a color bitmap that contains the images, whereas the second bitmap is a monochrome bitmap that contains a series of masks. When a masked image is drawn, the bits of the image are combined with the bits of the mask to produce transparent areas of the bitmap where a background color of the target device context shows through. In contrast, when a non-masked image is drawn, it is simply copied in the target device context and is drawn over existing background color of the device context.

Image lists are useful to display large sets of icons or bitmaps. As was discussed above, a single image list may contain the icons the bitmaps use for a number of tabs in a tab control. Likewise, image lists may be used in other applications wherein a number of icons or bitmaps are required. The operating system 24 provides a number of functions for displaying, managing and manipulating an image list. Code for these functions are provided in the controls DLL 26.

Figure 19:
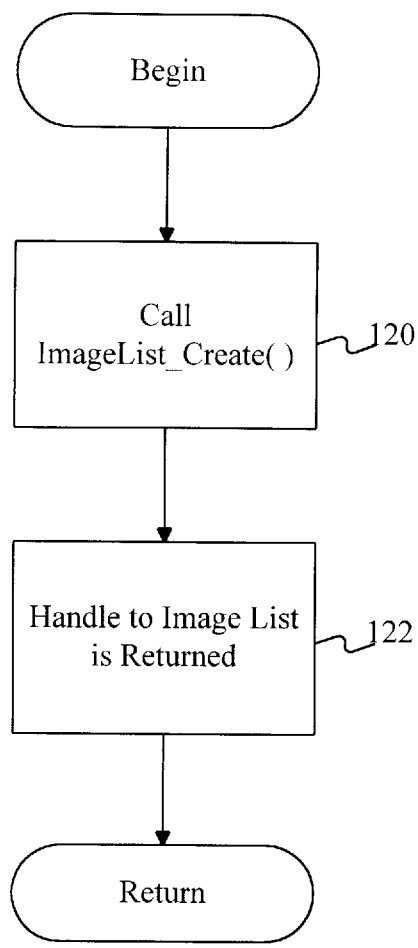
FIG. 19 illustrates the steps that are performed to create an image list in accordance with the preferred embodiment of the present invention.

An application creates an image list by calling the ImageList_Create( ) function provided by the operating system 24 (step 120 in FIG. 19). The parameters to this function call include the type of image list to be created, the dimension of each image in the image list and the number of images to be added to the list. For a non-masked image list, this function creates a single bitmap that is large enough to hold the specified number of images of the given dimensions. In such a case, the function creates a screen compatible device context and selects a bitmap for the device context. For a masked image list, the function creates two bitmaps and two screen compatible device contexts. The function selects the image bitmap for one device context and the masked bitmap for the other. If the function is successful, it returns a handle to the image list (step 122). This handle may be used as a parameter that is passed in other image list functions.

Figure 20:
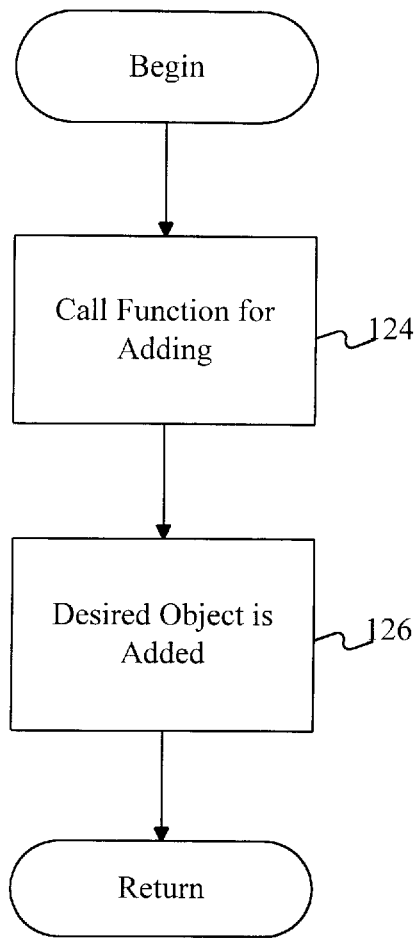
FIG. 20 is a flowchart illustrating the steps that are performed to add objects to an image list in accordance with the preferred embodiment of the present invention.

An application program can add bitmap images, icons or cursors to an image list. The operating system 24 provides a number of functions for adding different types of objects to image lists. In general, to add an object to an image list, the steps shown in the flowchart of FIG. 20 are performed. Initially, the application calls one of the functions for adding an object to the image list (step 124). The desired object is then added to the image list in response to the function call (step 126).

The ImageList_Add( ) function facilitates the addition of bitmap images to an image list. An application passes handles for up to two bitmaps as a parameter to this function. For non-masked image lists, only one handle is passed; whereas for masked image lists, up to two handles may be passed. A first handle points to a first bitmap that contains one or more images to add to the image list bitmap. The second handle identifies a second bitmap that contains masks to be added to the mask bitmap. For masked image lists, the ImageList_AddMask( ) function is provided to add bitmapped images to the masked image list.

Separate functions are provided for icons. In particular, the ImageList_AddIcon( ) function adds an icon or cursor to an image list. If the image list is masked, this function adds the mask provided with the icon or cursor to the mask bitmap. In addition, an icon, based on an image and mask in an image list, may be used to create an icon by calling the ImageList_ExtractIcon( ) function. This function returns the handle of the new icon.

The ImageList_AddFromImageList( ) function copies an image from one image list to another. The image in both the image lists must be the same size for this function.

It should be appreciated that indexes are assigned to each image as it is added to an image list. The indexes are zero-based such that the first image in a list has an index of zero, and the next image has an index of one, and so forth.

Figure 21:
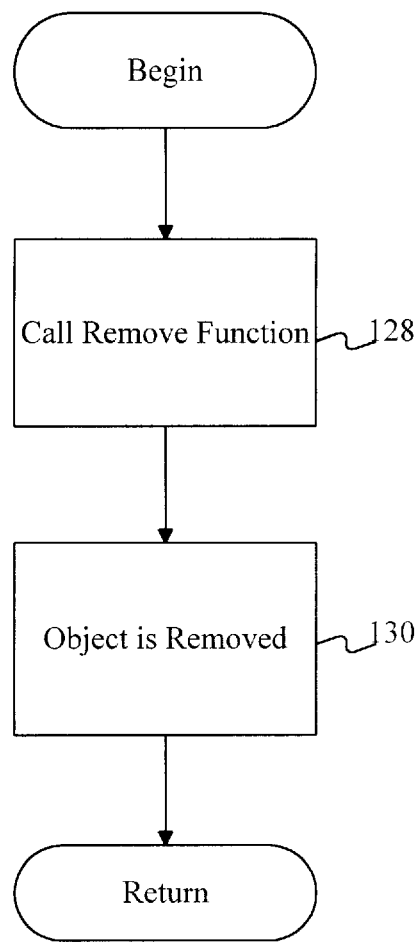
FIG. 21 is a flowchart illustrating the steps that are performed to remove objects from an image list in accordance with the preferred embodiment of the present invention.

Functions are also provided for removing objects from an image list. To remove an object from an image list, an application follows the steps shown in the flowchart of FIG. 21. First, the application calls the appropriate function to remove the object (step 128 in FIG. 21). In response to this function call, the operating system 24 removes the object from the image list (step 130). One such function is the ImageList_Remove( ) function that removes a particular image from an image list. Images may also be removed from an image list and replace with substitute images by calling the ImageList_Replace( ) function or the ImageList_ReplaceIcon( ) function. The first of these functions replaces the image with a bitmapped image and mask, whereas the second of these functions replaces an image with an icon or a cursor.

The ImageList_Merge( ) function merges two images and stores the new image in a new image list. The new image is created by drawing the second image transparently over the first image. The mask of the new image is the result that performing a logical OR operation on the bits of the mask for the two existing images.

The operating system 24 provides functions for drawing images on image lists. The ImageList_Draw and ImageList_Draw2( ) functions are provided to draw images from image lists. The first function simply displays an image list item to a device context, whereas the second function uses a specified drawing style (passed as a parameter) and blends the image with a specified color. The calling application passes the handle of an image list, an index to an image to be drawn, a handle of a destination device context, location within the device context and one or more drawing styles as parameters to these functions.

Every image list includes a list of images to use as overlay masks. An overlay mask is an image that is drawn transparently over another image. Up to four overlay masks may be specified per image list. Overlay images may be established by calling the ImageList_SetOverlayImage( ) function.

Figure 22:
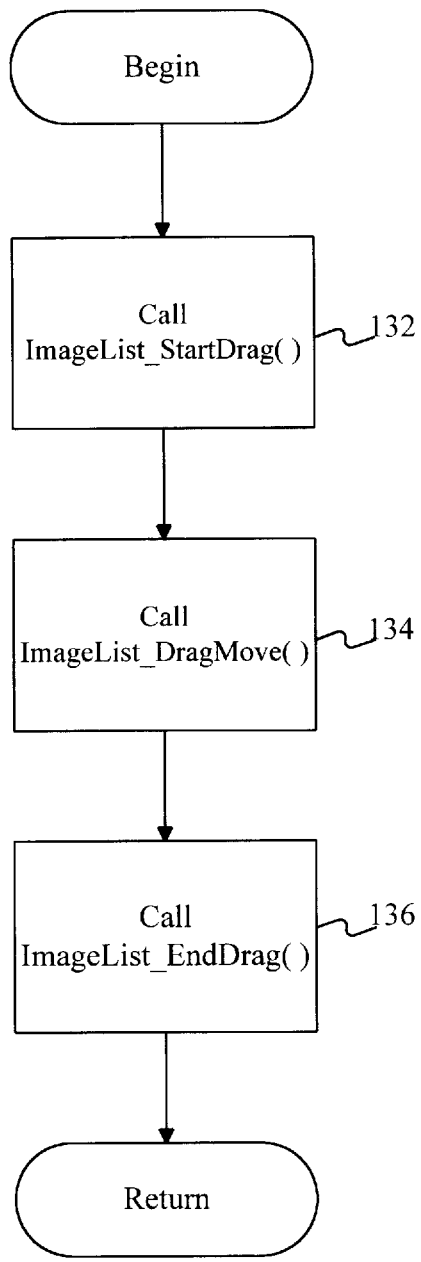
FIG. 22 is a flowchart illustrating the sequence of function calls that are performed to draw an image during a drag-and-drop operation in accordance with the preferred embodiment of the present invention.

The operation system 24 also includes functions for dragging an image in an image list on the video display 18. FIG. 22 is a flowchart showing the steps that are performed by an application during a drag-and-drop operation. An application calls the ImageList_StartDrag( ) function to be a drag-and-drop operation in response to the user using an input device to drag an image (step 132). The ImageList_StartDrag( ) function creates a new image by combining the image to be dragged with the current mouse cursor. As the image is dragged, the ImageList_DragMove( ) function is called to display the image at a new location that coincides with the hot spot of the mouse cursor (step 134). At the end of the drag operation, the ImageList_EndDrag( ) function is called.

While the present invention has been described with reference to a preferred embodiment thereof, those skilled in the art will appreciate that various changes in form and detail may be made without departing from the intended scope of the present invention as defined in the appended claims.

The controls of the preferred embodiment of the present invention are described in more detail hereinbelow.

24

Header Controls

About Header Controls

A *header control* is a window usually positioned above columns of text or numbers. It contains a title for each column, and it can be divided into parts. The user can drag the dividers that separate the parts to set the width of each column. The following illustration shows a header control that labels the columns in a detailed listing of the files in a directory.

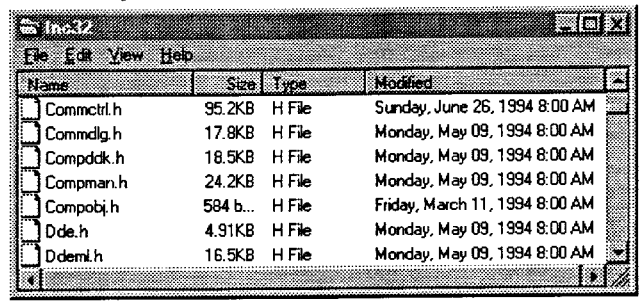

You can create a header control by using the CreateWindow or CreateWindowEx function, specifying the WC_HEADER window class. This window class is registered when the common control dynamic-link library (DLL) is loaded. To ensure that this DLL is loaded, use the InitCommonControls function. Once you create a header control, you can divide it into parts, set the text in each part, and control the appearance of the window by using header window messages.

Styles

Header controls have a number of styles that determine aspects of the control's appearance and behavior. You set the initial styles when you create the header control. To retrieve and change the styles after creating the control, use the GetWindowLong and SetWindowLong functions.

A header control can be divided into two or more parts called *header items*. If a header control has the HDS_BUTTONS style, each item in the control looks and behaves like a push button. This style is useful if your application carries out a task when the user clicks an item in the header. For example, an application could sort information in the columns differently depending on which item the user clicks. The HDS_HORZ style creates a header control with a horizontal orientation. The HDS_VERT style is not currently implemented.

Size and Position

Typically, you must set the size and position of a header control to fit within the boundaries of a particular rectangle, such as the client area of a window. By using the HDM_LAYOUT message, you can retrieve the appropriate size and position values from the header control itself.

When sending this message, you specify the address of an HD_LAYOUT structure that contains the coordinates of the rectangle that the header control is to occupy and provides a pointer to a WINDOWPOS structure. The control fills the WINDOWPOS structure with size and position values appropriate for positioning the control along the top of the specified rectangle. The height value is the sum of the widths of the control's horizontal borders and the average height of characters in the font currently selected into the control's device context (DC).

If you want to use the HDM_LAYOUT message to set the initial size and position of a header control, set the initial visibility state of the control so that it is hidden. After sending HDM_LAYOUT to retrieve the size and position values, use the SetWindowPos function to set the new size, position, and visibility state.

Items

Each item in a header control can have a string, a bitmapped image, and an application-defined 32-bit value associated with it. The string and bitmap are displayed within the boundaries of the item. If an item contains both a string and an image, the image is displayed above the string. If the string and image overlap, the string overwrites the overlapping portion of the image.

You add an item to a header control by sending the HDM_INSERTITEM message to the control. The message includes the address of an HD_ITEM structure that defines the properties of the item, including its string, bitmap, initial size, and application-defined value. The structure also specifies formatting flags that tell the control whether to center, left-align, or right-align the string or bitmap in the item's rectangle.

HDM_INSERTITEM returns the index of the newly added item. You use the index in other messages to set properties or to retrieve information about the item. You can delete an item by using the HDM_DELETEITEM message, specifying the index of the item to delete.

You can use the HDM_SETITEM message to set the properties of an existing header item and the HDM_GETITEM message to retrieve the current properties of an item. To retrieve a count of the items in a header control, use the HDM_GETITEMCOUNT message.

Owner-Drawn Header Controls

You can define individual items of a header control to be owner-drawn items. Using this technique gives you more control than you would otherwise have over the appearance of the header item.

You can use the HDM_INSERTITEM message to insert a new owner-drawn item into a header control or the HDM_SETITEM message to change an existing item to an owner-drawn item. Both messages include the address of an HD_ITEM structure, which should have the fmt member set to HDF_OWNERDRAW. When a header control must draw an owner-drawn item, it sends the WM_DRAWITEM message to the parent window. The *wParam* parameter of the message is the child window identifier of the header control, and the *lParam* parameter is a pointer to a DRAWITEMSTRUCT structure. The parent window uses the information in the structure to draw the item. For an owner-drawn item in a header control, the DRAWITEMSTRUCT structure contains the following information.

| Member | Description |
|---|---|
| CtlType | ODT_HEADER owner-drawn control type. |
| CtlID | Child-window identifier of the header control. |
| itemID | Index of the item to be drawn. |
| itemAction | ODA_DRAWENTIRE drawing-action flag. |
| itemState | ODS_SELECTED if the cursor is on the item and the mouse button is down. Otherwise, it is zero. |
| hwndItem | Handle of the header control. |

| | |
|---|---|
| hDC | Handle of the DC of the header control. |
| rcItem | Coordinates of the header item to be drawn. The coordinates are relative to the upper left corner of the header control. |
| itemData | Application-defined 32-bit value associated with the item. |

Notification Messages

A header control sends notification messages to its parent window when the user clicks or double-clicks an item, when the user drags an item divider, and when the attributes of an item change. The parent window receives the notifications in the form of WM_NOTIFY messages. A header control sends the following notifications.

| Notification | Description |
|---|---|
| HDN_BEGINTRACK | Signals the start of divider dragging. |
| HDN_DIVIDERDBLCLICK | Indicates that the user double-clicked a divider. |
| HDN_ENDTRACK | Signals the end of divider dragging. |
| HDN_ITEMCHANGED | Indicates a change in the attributes of an item. |
| HDN_ITEMCHANGING | Indicates that the attributes of an item are about to change. |
| HDN_ITEMCLICK | Indicates that the user clicked an item. |
| HDN_TRACK | Indicates that the user dragged a divider. |

Default Message Processing

The following table summarizes the window messages handled by the window procedure for the WC_HEADER window class.

| Message | Processing performed |
|---|---|
| WM_CREATE | Initializes the header control. |
| WM_DESTROY | Frees resources allocated for the header control. |
| WM_ERASEBKGND | Erases the background of the header control using the current background color for the control. |
| WM_GETDLGCODE | Returns a combination of the DLGC_WANTTAB and DLGC_WANTARROWS values. |
| WM_GETFONT | Returns the handle of the current font with which the header control draws its text. |
| WM_LBUTTONDBLCLK | Captures mouse input. If the mouse cursor is on a divider, the control sends a HDN_BEGINTRACK notification message and begins tracking mouse movement. If the cursor is on a header item, the control redraws the item in the style that indicates the item is pressed. |
| WM_LBUTTONDOWN | Same as the WM_LBUTTONDBLCLK message. |
| WM_LBUTTONUP | Releases the mouse capture. If the control was tracking mouse movement, it sends the HDN_ENDTRACK notification message and redraws the header control. Otherwise, the control sends the HDN_ITEMCLICK notification message and redraws the header item that was clicked. |

27

| | |
|---|---|
| WM_MOUSEMOVE | If a divider is being dragged, the control sends the HDN_TRACK notification message and redraws itself. If the left mouse button is down and the cursor is on an item, the control redraws the item in the style that indicates the item is pressed. |
| WM_NCCREATE | Allocates and initializes an internal data structure. |
| WM_NCDESTROY | Frees resources allocated by the header control. |
| WM_PAINT | Paints the invalid region of the header control. |
| WM_SETCURSOR | Sets the cursor shape depending on whether the cursor is on a divider or in a header item. |
| WM_SETFONT | Selects a new font handle into the DC for the header control. |

Using Header Controls

This section contains examples demonstrating how to create a header control and add items to it.

Creating a Header Control

The following example creates a header control and positions it along the top of the parent window's client area. The control is initially hidden. Next, the example uses the HDM_LAYOUT message to determine the appropriate size and position of the control given the bounding rectangle of the parent window. Finally, the example sets the size and position of the control and makes it visible.

```
// DoCreateHeader - creates a header control that is positioned along
//      the top of the parent window's client area.
// Returns the handle of the header control.
// hwndParent - handle of the parent window
//
// Global variable
//      g-hist - handle of the application instance extern HINSTANCE g_hinst;

HWND DoCreateHeader(HWND hwndParent)
{
        HWND hwndHeader;
        RECT rcParent;
        HD_LAYOUT hdl;
        WINDOWPOS wp;

// Ensure that the common control DLL is loaded and then create
        // the header control.

InitCommonControls();

if ((hwndHeader = CreateWindowEx(0, WC_HEADER, (LPCTSTR) NULL,
                WS_CHILD | WS_BORDER | HDS_BUTTONS | HDS_HORZ,
                0, 0, 0, 0, hwndParent, (HMENU) ID_HEADER, g_hinst,
                (LPVOID) NULL)) == NULL)
            return (HWND) NULL;

// Retrieve the bounding rectangle of the parent window's
        // client area and then request size and position values
        // from the header control.
```

28

```
    GetClientRect(hwndParent, &rcParent);

hdl.prc = &rcParent;
    hdl.pwpos = ℘
    if (!SendMessage(hwndHeader, HDM_LAYOUT, 0, (LPARAM) &hdl))
        return (HWND) NULL;

// Set the size, position, and visibility of the header control.

SetWindowPos(hwndHeader, wp.hwndInsertAfter, wp.x, wp.y,
        wp.cx, wp.cy, wp.flags | SWP_SHOWWINDOW);

return hwndHeader;
}
```

Adding an Item to a Header Control

The following example demonstrates how to use the HDM_INSERTITEM message and the HD_ITEM structure to add an item to a header control. The new item consists of a string that is left justified within the item rectangle.

```
// DoInsertItem - inserts items into a header control.
// Returns the index of the newly added item.
// hwndHeader - handle of the header control
// iInsertAfter - index of the previous item
// nWidth - width of the new item
// lpsz - address of the item string int DoInsertItem(HWND hwndHeader, int iInsertAfter,
    int nWidth, LPSTR lpsz)
{
    HD_ITEM hdi;
    int index;

hdi.mask = HDI_TEXT | HDI_FORMAT | HDI_WIDTH;
    hdi.pszText = lpsz;
    hdi.cxy = nWidth;
    hdi.cchTextMax = lstrlen(hdi.pszText);
    hdi.fmt = HDF_LEFT | HDF_STRING;

index = SendMessage(hwndHeader, HDM_INSERTITEM,
        (WPARAM) iInsertAfter, (LPARAM) &hdi);

return index;

}
```

Reference

This section describes the messages, notification messages, and structures associated with header controls. These elements are grouped as follows.

| Size and Position | Inserting and Deleting Items |
|---|---|
| HDM_LAYOUT | HDM_DELETEITEM |
| HD_LAYOUT | HDM_INSERTITEM |

29

| Item Attributes | HDN_ITEMCLICK |
|---|---|
| HDM_SETITEM | HD_ITEM |
| HDN_ITEMCHANGED | HD_NOTIFY |
| HDN_ITEMCHANGING | Divider Tracking |
| HDN_TRACK | HDN_BEGINTRACK |
| Item Information | HDN_ENDTRACK |
| HDM_GETITEM | |
| HDM_GETITEMCOUNT | |

Messages

An application sends messages to add items and to control the appearance and behavior of a header control. Each message has a corresponding macro, which you can use instead of sending the message explicitly. There are the following header control messages.

HDM_DELETEITEM

```
HDM_DELETEITEM
wParam = (WPARAM) (int) i
lParam = 0;

// Corresponding macro
BOOL Header_InsertItem(hwndHD, i);
```

Deletes an item from a header control.
- Returns TRUE if successful or FALSE otherwise.

*hwndHD* and *i*
  Handle of the header control, and the index of the item to delete.

HDM_GETITEM

```
HDM_GETITEM
wParam = (WPARAM) (int) i;
lParam = (LPARAM) (HD_ITEM FAR*) phdi;

// Corresponding macro
BOOL Header_GetItem(hwndHD, i, phdi);
```

Retrieves information about an item in a header control.
- Returns TRUE if successful or FALSE otherwise.

*hwndHD* and *i*
  Handle of the header control, and the index of the item for which information is to be retrieved.

30

*phdi*
    Address of an HD_ITEM structure. When the message is sent, the mask member indicates the type of information being requested. When the message returns, the other members receive the requested information. If mask specifies zero, the message returns TRUE but copies no information to the structure.

HDM_GETITEMCOUNT

```
HDM_GETITEMCOUNT
wParam = 0;
lParam = 0;

// Corresponding macro
int Header_GetItemCount(hwndHD);
```

Retrieves a count of the items in a header control.
- Returns the number of items if successful or −1 otherwise.

*hwndHD*
    Handle of the header control.

HDM_INSERTITEM

```
HDM_INSERTITEM
wParam = (WPARAM) (int) i
lParam = (LPARAM) (const HD_ITEM FAR*) phdi // Corresponding macro
int Header_InsertItem(hwndHD, i, phdi);
```

Inserts a new item into a header control.
- Returns the index of the new item if successful or −1 otherwise.

*hwndHD* and *i*
    Handle of the header control, and the index of the item after which the new item is to be inserted. The new item is inserted at the end of the header control if *i* is greater than or equal to the number of items in the control. If *i* is zero, the new item is inserted at the beginning of the header control.

*phdi*
    Address of an HD_ITEM structure that contains information about the new item.

HDM_LAYOUT

```
HDM_LAYOUT
```

```
wParam = 0;
lParam = (LPARAM) (HD_LAYOUT FAR*) playout;

// Corresponding macro
BOOL Header_Layout(hwndHD, playout);
```

Retrieves the size and position of a header control within a given rectangle. This message is used to determine the appropriate dimensions for a new header control that is to occupy the given rectangle.
• Returns TRUE if successful or FALSE otherwise.

*hwndHD*
    Handle of the header control.

*playout*
    Address of an HD_LAYOUT structure. The prc member specifies the coordinates of a rectangle, and the pwpos member receives the size and position for the header control within the rectangle.

HDM_SETITEM

```
HDM_SETITEM
wParam = (WPARAM) (int) i;
lParam = (LPARAM) (const HD_ITEM FAR*) phdi;

// Corresponding macro
BOOL Header_SetItem(hwndHD, i, phdi);
```

Sets the attributes of the specified item in a header control.
• Returns TRUE if successful or FALSE otherwise.

*hwndHD* and *i*
    Handle of the header control, and the index of the item whose attributes are to be changed.

*phdi*
    Address of an HD_ITEM structure. When the message is sent, the mask member indicates the attributes to set. The other members specify new attributes.

The HDN_ITEMCHANGING notification message is sent to the parent window before the item attributes are changed. The parent window can return FALSE to prevent the changes, and in that case HDM_SETITEM returns FALSE. If the parent window returns TRUE, the changes are made and the parent window receives the HDN_ITEMCHANGED notification message.

Notification Messages

A header control sends notification messages, in the form of WM_NOTIFY messages, to its parent window to notify it about events. The following notification messages are specific to header controls.

HDN_BEGINTRACK

```
HDN_BEGINTRACK
phdn = (HD_NOTIFY FAR *) lParam;
```

Notifies a header control's parent window that the user has begun dragging a divider in the control. That is, the user has pressed the left mouse button while the mouse cursor is on a divider in the header control. This notification message is sent in the form of a WM_NOTIFY message.
- Returns FALSE to allow tracking of the divider or TRUE to prevent tracking.

*phdn*
 Address of an HD_NOTIFY structure that contains information about the header control and the item whose divider is to be dragged.

HDN_DIVIDERDBLCLICK

```
HDN_DIVIDERDBLCLICK
phdn = (HD_NOTIFY FAR *) lParam;
```

Notifies a header control's parent window that the user double-clicked the divider area of the control. This notification message is sent in the form of a WM_NOTIFY message.
- No return value.

*phdn*
 Address of an HD_NOTIFY structure that contains information about the header control and the item whose divider was double-clicked.

HDN_ENDTRACK

```
HDN_BEGINTRACK
phdn = (HD_NOTIFY FAR *) lParam;
```

Notifies a header control's parent window that the user has finished dragging a divider. This notification message sent in the form of a WM_NOTIFY message.
- No return value.

*phdn*
>Address of an HD_NOTIFY structure that contains information about the
>header control and the item whose divider was dragged.

HDN_ITEMCHANGED

```
HDN_ITEMCHANGED
phdr = (HD_NOTIFY FAR *) lParam;
```

Notifies a header control's parent window that the attributes of a header item have
changed. This notification message is sent in the form of a WM_NOTIFY message.
- No return value.

*phdr*
>Address of an HD_NOTIFY structure that contains information about the
>header control and the new attributes of the item that has changed.

HDN_ITEMCHANGING

```
HDN_ITEMCHANGING
phdr = (HD_NOTIFY FAR *) lParam;
```

Notifies a header control's parent window that the attributes of a header item are
about to change. This notification message is sent in the form of a WM_NOTIFY
message.
- Returns FALSE to allow the changes or TRUE to prevent them.

*phdr*
>Address of an HD_NOTIFY structure that contains information about the
>header control and the item, including the attributes that are about to change.

HDN_ITEMCLICK

```
HDN_ITEMCLICK
phdr = (HD_NOTIFY FAR *) lParam;
```

Notifies a header control's parent window that the user clicked the control. This
notification message is sent in the form of a WM_NOTIFY message.
- No return value.

*phdr*
>Address of an HD_NOTIFY structure that identifies the header control and
>specifies the index of the item that was clicked and the mouse button used to
>click the item. The pitem member is set to NULL.

A header control sends this notification message after the user releases the left mouse button.

HDN_TRACK

```
HDN_TRACK
phdr = (HD_NOTIFY FAR *) lParam;
```

Notifies a header control's parent window that the user is dragging a divider in the header control. This notification message is sent in the form of a WM_NOTIFY message.
- Returns FALSE to continue tracking the divider or TRUE to end tracking.

*phdr*
    Address of an HD_NOTIFY structure that contains information about the header control and the item whose divider is being dragged.

Structures

The following structures are used specifically with header control messages.

HD_ITEM

```
typedef struct _HD_ITEM {    hdi
    UINT    mask;       // see below
    int     cxy;        // width or height of item
    LPSTR   pszText;    // address of item string
    HBITMAP hbm;        // handle of item bitmap
    int     cchTextMax; // length of item string, in characters
    int     fmt;        // see below
    LPARAM  lParam;     // application-defined item data
} HD_ITEM;
```

Contains information about an item in a header control.

mask
    Mask flags that indicate which of the other structure members contain valid data. It can be a combination of these values:

| | |
|---|---|
| HDI_BITMAP | The hbm member is valid. |
| HDI_FORMAT | The fmt member is valid. |
| HDI_HEIGHT | The cxy member is valid and specifies the height of the item. |
| HDI_LPARAM | The lParam member is valid. |
| HDI_TEXT | The pszText and cchTextMax members are valid. |
| HDI_WIDTH | The cxy member is valid and specifies the width of the item. | fmt
    Format flags. It can be one of the following values:

| | |
|---|---|
| HDF_CENTER | Centers the contents of the item. |
| HDF_LEFT | Left-aligns the contents of the item. |
| HDF_RIGHT | Right-aligns the contents of the item. |

The preceding value is combined with one of the following values:

| | |
|---|---|
| HDF_BITMAP | The item displays a bitmap. |
| HDF_OWNERDRAW | The owner window of the header control draws the item. |
| HDF_STRING | The item displays a string. |

HD_LAYOUT

```
typedef struct _HD_LAYOUT {   // hdl
    RECT FAR* prc;            // see below
    WINDOWPOS FAR* pwpos;     // see below
} HD_LAYOUT;
```

Contains information used to set the size and position of a header control. This structure is used with the HDM_LAYOUT message.

prc
    Address of a RECT structure that contains the coordinates of a rectangle in which a header control is to be drawn.

pwpos
    Address of a WINDOWPOS structure that receives information about the appropriate size and position of the header control.

HD_NOTIFY

```
typedef struct _HD_NOTIFY {   // hdn
    NMHDR   hdr;              // required for all WM_NOTIFY messages
    int     iItem;            // index of item associated with notification
    int     iButton;          // see below
    HD_ITEM FAR* pitem;       // see below
} HD_NOTIFY;
```

Contains information used to process notification messages from a header control.

iButton
    Index of the mouse button involved in generating the notification message. It can be one of these values:

| | |
|---|---|
| 0 | Left button |
| 1 | Right button |
| 2 | Middle button | pitem
    Address of an HD_ITEM structure that contains information about the header item associated with the notification message.

Constants

The following table describe the header control's window styles.

| | |
|---|---|
| HDS_BUTTONS | Header items behave like buttons. |
| HDS_HORZ | The header control is horizontal. |
| HDS_VERT | The header control is vertical (this style is not currently implemented). |

37

Hot Key Controls

About Hot Key Controls

A *hot key control* is a window that enables the user to create a hot key. A *hot key* is a key combination that the user can press to perform an action quickly. (For example, a user can create a hot key that activates a given window and brings it to the top of the Z order.) The hot key control displays the user's choices and ensures that the user selects a valid key combination.

When the user has chosen a key combination, an application retrieves the specified key combination from the control and uses the WM_SETHOTKEY message to set up the hot key in the system. Whenever the user presses the hot key after that, from any part of the system, the window specified in the WM_SETHOTKEY message receives a WM_SYSCOMMAND message specifying the SC_HOTKEY value. This message activates the window that receives it. The hot key remains valid until the application that called WM_SETHOTKEY exits.

Hot keys created by hot key controls are different from the hot key support that depends on the WM_HOTKEY message and the RegisterHotKey and UnregisterHotKey functions. Hot keys registered by using RegisterHotKey can be used for other tasks than simply activating a window. For information about hot keys of this kind, see Chapter 5, "Keyboard Input."

Hot Key Control Creation

You create a hot key control by using the CreateWindowEx function and the HOTKEY_CLASS window class. When the function returns a handle to the hot key control, an application typically sets some rules about invalid hot key combinations and provides perhaps a default key combination. If an application does not set any rules, the user can choose any key or key combination as a hot key. Most applications do not allow the user to use a common key (for example, the letter A) as a hot key.

Hot Key Control Messages

After creating a hot key control, an application interacts with it by using three messages: HKM_SETRULES, HKM_SETHOTKEY, and HKM_GETHOTKEY.

An application can send the HKM_SETRULES message to specify a set of CTRL, ALT, and SHIFT key combinations that are considered invalid hot keys. If the application specifies an invalid key combination, it should also specify a default modifier combination to use when the user selects the invalid combination. When the user enters the invalid combination, the system performs a logical OR operation on the invalid combination entered by the user and the default combination. The result is considered a valid combination; it is converted to a string and displayed in the control.

The HKM_SETHOTKEY message allows an application to set the hot key combination for a hot key control. This message is also typically used when the hot key control is created.

Applications use the HKM_GETHOTKEY message to retrieve the virtual-key code and modifier flags of the hot key chosen by the user of a hot key control.

Default Message Processing

This section describes the window messages handled by the window procedure for the predefined HOTKEY_CLASS window class used with hot key controls.

| Message | Processing performed |
|---|---|
| WM_CHAR | Retrieves the virtual-key code. |
| WM_CREATE | Initializes the hot key control, sets no hot key rules, and uses the system font. |
| WM_ERASEBKGND | Hides the caret, calls the DefWindowProc function, and shows the caret again. |
| WM_GETDLGCODE | Returns a combination of the DLGC_WANTCHARS and DLGC_WANTARROWS values. |
| WM_GETFONT | Retrieves the font. |
| WM_KEYDOWN | Calls the DefWindowProc function if the key is RETURN, TAB, SPACE, DELETE, ESCAPE, or BACKSPACE. If the key is SHIFT, CONTROL, or VK_MENU, it checks whether the combination is valid and, if so, sets the hot key using the combination. Other keys are set as hot keys without their validity being checked first. |
| WM_KEYUP | Retrieves the virtual-key code. |
| WM_KILLFOCUS | Destroys the caret. |
| WM_LBUTTONDOWN | Sets the focus to the window. |
| WM_NCCREATE | Sets the WS_EX_CLIENTEDGE window style. |
| WM_PAINT | Paints the hot key control. |
| WM_SETFOCUS | Creates and shows the caret. |
| WM_SETFONT | Sets the font. |
| WM_SYSCHAR | Retrieves the virtual-key code. |

| | |
|---|---|
| WM_SYSKEYDOWN | Calls the DefWindowProc function if the key is RETURN, TAB, SPACE, DELETE, ESCAPE, or BACKSPACE. If the key is SHIFT, CONTROL, or VK_MENU, it checks whether the combination is valid and, if so, sets the hot key using the combination. Other keys are set as hot keys without their validity being checked first. |
| WM_SYSKEYUP | Retrieves the virtual-key code. |

Using Hot Key Controls

This section contains examples demonstrating how to perform the following tasks:
- Create a hot key control.
- Retrieve a hot key from the control.
- Set the hot key to activate a specified window.

Creating a Hot Key Control

The following function creates a hot key control, uses the HKM_SETRULES and HKM_SETHOTKEY messages to initialize it, and returns a handle to the control. This hot key control does not allow the user to choose a hot key that is a single unmodified key, nor does it permit the user to choose only SHIFT and a key. (These rules effectively prevent the user from choosing a hot key that might be accidentally entered while typing text.)

```
// InitializeHotkey - creates hot key and sets rules and default
//     settings for it.
// Returns the handle of the hot key control.
// hwndDlg - handle of the parent window (dialog box)
//
// Global variable
//     g_hinst - handle of the application instance extern HINSTANCE g_hinst;
HWND WINAPI InitializeHotkey(HWND hwndDlg)
{
    // Ensure that the common control DLL is loaded.

InitCommonControls();

hwndHot = CreateWindowEx(
        0,                          // no extended styles
        HOTKEY_CLASS,               // class name
        "Hotkey Control",           // title (caption)
        WS_CHILD | WS_VISIBLE,      // style
        10, 10,                     // position
        200, 20,                    // size
```

40

```
        hwndDlg,                    // parent window
        NULL,                       // uses class menu
        g_hinst,                    // instance
        NULL                        // no WM_CREATE parameter
        );

SetFocus(hwndHot);

// Set rules for invalid key combinations. If the user
    // does not supply a modifier key, use ALT as a modifier.
    // If the user supplies SHIFT as a modifier key, use
    // SHIFT + ALT instead.

SendMessage(hwndHot, HKM_SETRULES,
        (WPARAM) HKCOMB_NONE | HKCOMB_S, // invalid key combinations
        MAKELPARAM(HOTKEYF_ALT, 0));    // add ALT to invalid entries // Set CONTROL + ALT + A as the default hot key for this window.
    // 0x41 is the virtual-key code for 'A'.

SendMessage(hwndHot, HKM_SETHOTKEY,
        MAKEWORD(0x41, HOTKEYF_CONTROL | HOTKEYF_ALT), 0);

return hwndHot;
}
```

Retrieving and Setting a Hot Key

After the user has chosen a hot key, an application should retrieve the hot key from the hot key control by using the HKM_GETHOTKEY message. This message retrieves a 16-bit value that contains the virtual-key code and modifier keys that describe the hot key.

The WM_SETHOTKEY message associates a hot key with a specified window. Note, however, that you cannot set a hot key for a window that has the WS_CHILD window style.

The following function retrieves and sets a hot key.

```
// ProcessHotkey - retrieves the hot key from the hot key control and
//      sets it as the hot key for the application's main window.
// Returns TRUE if successful or FALSE otherwise.
// hwndHot - handle of the hot key control
// hwndMain - handle of the main window BOOL WINAPI ProcessHotkey(HWND hwndHot, HWND hwndMain)
{
    WORD wHotkey;
    UINT iSetResult;

// Retrieve the hot key (virtual-key code and modifiers).
```

41

```
wHotkey = SendMessage(hwndHot, HKM_GETHOTKEY, 0, 0);

// Use the result as wParam for WM_SETHOTKEY.

iSetResult = SendMessage(hwndMain, WM_SETHOTKEY, wHotkey, 0);

switch (iSetResult) {
    case 2:             // WM_SETHOTKEY succeeded
        MessageBox(NULL, "Hot key previously assigned",
            "Okay", MB_OK);
        return TRUE;

case 1:             // WM_SETHOTKEY succeeded
        return TRUE;

case 0:
        MessageBox(NULL, "Invalid window for hot key",
            "Error", MB_OK);
        return FALSE;

case -1:
        MessageBox(NULL, "Invalid hot key",
            "Error", MB_OK);
        return FALSE;

default:
        MessageBox(NULL, "Unknown error", "Error", MB_OK);
        return FALSE;
    }
}
```

Reference

Messages

This section describes the messages associated with hot key controls.

HKM_GETHOTKEY

HKM_GETHOTKEY
wParam = 0;
lParam = 0;

Retrieves the virtual-key code and modifier flags of a hot key from a hot key control.
- Returns the virtual-key code and modifier flags. The virtual-key code is in the low-order byte, and the modifier flags are in the high-order byte. The modifier flags can be a combination of the following values:

HOTKEYF_ALT                         ALT key

| | |
|---|---|
| HOTKEYF_CONTROL | CTRL key |
| HOTKEYF_EXT | Extended key |
| HOTKEYF_SHIFT | SHIFT key |

The 16-bit value returned by this message can be used as the *wParam* parameter in the WM_SETHOTKEY message.

HKM_SETHOTKEY

```
HKM_SETHOTKEY
wParam = MAKEWORD(bVKHotKey, bfMods);
lParam = 0;
```

Sets the hot key combination for a hot key control.
- No return value.

*bVKHotKey*
    Virtual-key code of the hot key.

*bfMods*
    Modifier flags indicating the keys that, when used in combination with *bVKHotKey*, define a hot key combination. For a list of modifier flag values, see the description of HKM_GETHOTKEY.

HKM_SETRULES

```
HKM_SETRULES
wParam = (WPARAM) fwCombInv;
lParam = MAKELPARAM(fwModInv, 0);
```

Defines the invalid combinations and the default modifier combination for a hot key control.
- No return value.

*fwCombInv*
    Array of flags that specify invalid key combinations. It can be a combination of the following values:

| | |
|---|---|
| HKCOMB_A | ALT |
| HKCOMB_C | CTRL |
| HKCOMB_CA | CTRL+ALT |
| HKCOMB_NONE | Unmodified keys |
| HKCOMB_S | SHIFT |
| HKCOMB_SA | SHIFT+ALT |
| HKCOMB_SC | SHIFT+CTRL |

43

| | |
|---|---|
| HKCOMB_SCA | SHIFT+CTRL+ALT |

*fwModInv*
    Array of flags that specify the key combination to use when the user enters an invalid combination. For a list of modifier flag values, see the description of HKM_GETHOTKEY.

When a user enters an invalid key combination, as defined by flags specified in the *fwCombInv* parameter, the system uses the OR operator to combine the keys entered by the user with the flags specified in the *fwModInv* parameter. The resulting key combination is converted into a string and then displayed in the hot key control.

44

Tab Controls

About Tab Controls

A *tab control* is analogous to the dividers in a notebook or the labels in a file cabinet. By using a tab control, an application can define multiple *pages* for the same area of a window or dialog box. Each page consists of a set of information or a group of controls that the application displays when the user selects the corresponding tab. A special type of tab control displays tabs that look like buttons. Clicking a button should immediately perform a command instead of displaying a page.

You can create a tab control by calling the CreateWindow or CreateWindowEx function, specifying the WC_TABCONTROL window class. This window class is registered when the common controls dynamic-link library (DLL) is loaded. To make sure the DLL is loaded, use the InitCommonControls function.

You send messages to a tab control to add tabs and to otherwise affect the control's appearance and behavior. Each message has a corresponding macro, which you can use instead of sending the message explicitly.

Tab Control Styles

You can control specific characteristics of tab controls by specifying tab control styles (window styles specific to tab controls). For example, you can specify the alignment and general appearance of the tabs in a tab control.

You can cause the tabs to look like buttons by specifying the TCS_BUTTONS style. Tabs in this type of tab control should serve the same function as button controls. That is, clicking a tab should carry out a command instead of displaying a page. Because the display area in a button tab control is typically not used, no border is drawn around it.

You can specify that a tab receives the input focus when clicked by using the TCS_FOCUSONBUTTONDOWN style. This style is typically used only with the TCS_BUTTONS style. You can specify that a tab never receives the input focus by using the TCS_FOCUSNEVER style.

By default, a tab control displays only one row of tabs. If not all tabs can be shown at once, the tab control displays an up-down control so that the user can scroll additional tabs into view. For more information about up-down controls, see Chapter

45

22, "Up-Down Controls." You can cause a tab control to display multiple rows of tabs, if necessary, by specifying the TCS_MULTILINE style. In this way, all tabs can be displayed at once. The tabs are left-aligned within each row unless you specify the TCS_RIGHTJUSTIFY style. In this case, the width of each tab is increased so that each row of tabs fills the entire width of the tab control.

A tab control automatically sizes each tab to fit its icon, if any, and its label. To give all tabs the same width, you can specify the TCS_FIXEDWIDTH style. The control sizes all the tabs to fit the widest label, or you can assign a specific width and height by using the TCM_SETITEMSIZE message. Within each tab, the control centers the icon and label with the icon to the left of the label. You can force the icon to the left, leaving the label centered, by specifying the TCS_FORCEICONLEFT style. You can left-align both the icon and label by using the TCS_FORCELABELLEFT style. You cannot use the TCS_FIXEDWIDTH style with the TCS_RIGHTJUSTIFY style.

You can specify that the parent window draws the tabs in the control by using the TCS_OWNERDRAWFIXED style. For more information about owner-drawn tabs, see "Owner-Drawn Tabs" later in this chapter.

You can specify that a tab control create a tool tip control by using the TCS_TOOLTIPS style. For more inforation about using tool tip controls with a tab control, see "Tooltip Controls" later in this chapter.

Tabs and Tab Attributes

Each tab in a tab control consists of an icon, a label, and application-defined data. This information is specified by a TC_ITEM structure. You can add tabs to a tab control, get the number of tabs, retrieve and set the contents of a tab, and delete tabs. Tabs are identified by their zero-based index.

To add tabs to a tab control, use the TCM_INSERTITEM message, specifying the position of the item and the address of a TC_ITEM structure. You can retrieve and set the contents of an existing tab by using the TCM_GETITEM and TCM_SETITEM messages. For each tab, you can specify an icon, a label, or both. You can also specify application-defined data to associate with the tab.

You can retrieve the current number of tabs by using the TCM_GETITEMCOUNT message. You can delete a tab by using the TCM_DELETEITEM message. You can delete all tabs in a tab control by using the TCM_DELETEALLITEMS message.

You can associate application-defined data with each tab. For example, you might save information about each page with its corresponding tab. By default, a tab control allocates four extra bytes per tab for application-defined data. You can change the number of extra bytes per tab by using the TCM_SETITEMEXTRA message. You can only use this message when the tab control is empty.

The application-defined data is specified by the lParam member of the TC_ITEM structure. If you use more than four bytes of application-defined data you need to define your own structure and use it instead of the TC_ITEM structure. You can retrieve and set application-defined data the same way you retrieve and set other information about a tab—by using the TCM_GETITEM and TCM_SETITEM messages.

The first member of your structure must be a TC_ITEMHEADER structure, and the remaining members must specify application-defined data. The TC_ITEMHEADER structure is identical to the TC_ITEM structure except that it does not have the lParam member. The difference between the size of your structure and the size of the TC_ITEMHEADER structure should equal the number of extra bytes per tab.

Display Area

The *display area* of a tab control is the area in which an application displays the current page. Typically, an application creates a child window or dialog box, setting the window size and position to fit the display area. Given the window rectangle for a tab control, you can calculate the bounding rectangle of the display area by using the TCM_ADJUSTRECT message.

Sometimes the display area must be a particular size—for example, the size of a modeless child dialog box. Given the bounding rectangle for the display area, you can use the TCM_ADJUSTRECT message to calculate the corresponding window rectangle for the tab control.

Tab Selection

When the user selects a tab, a tab control sends its parent window notification messages in the form of WM_NOTIFY messages. The TCN_SELCHANGING notification message is sent before the selection changes, and the TCN_SELCHANGE notification message is sent after the selection changes.

You can process the TCN_SELCHANGING notification message to save the state of the outgoing page. You can return TRUE to prevent the selection from changing. For example, you might not want to switch away from a child dialog box in which a control has an invalid setting.

You must process the TCN_SELCHANGE notification message to display the incoming page in the display area. This might simply entail changing the information displayed in a child window. More often, each page consists of a child window or dialog box. In this case, an application might process this notification by destroying or hiding the outgoing child window or dialog box and by creating or showing the incoming child window or dialog box.

You can retrieve and set the current selection by using the TCM_GETCURSEL and TCM_SETCURSEL messages.

Tab Control Image Lists

Each tab can have an icon associated with it, which is specified by an index into the image list for the tab control. When it is created, a tab control has no image list associated with it. An application can create an image list by using the ImageList_Create function and then assign it to a tab control by using the TCM_SETIMAGELIST message.

You can add images to a tab control's image list just as you would to any other image list. However, an application should remove images by using the TCM_REMOVEIMAGE message instead of the ImageList_Remove function. This message ensures that each tab remains associated with the same image it had been. When a tab control is destroyed, it destroys any image list associated with it. You can keep an image list from being destroyed by specifying the TCS_SHAREIMAGELISTS window style. This style is useful if you want to assign the same image list to multiple tab controls.
To retrieve the handle of the image list currently associated with a tab control, you can use the TCM_GETIMAGELIST message.

Tab Size and Position

Each tab in a tab control has a size and position. You can set the size of tabs, retrieve the bounding rectangle of a tab, or determine which tab is at a specified position.
For fixed-width and owner-drawn tab controls, you can set the exact width and height of tabs by using the TCM_SETITEMSIZE message. In other tab controls, each tab's size is calculated based on the icon and label for that tab. The tab control includes space for a border and an additional margin. You can set the thickness of the margin by using the TCM_SETPADDING message.
You can determine the current bounding rectangle for a tab by using the TCM_GETITEMRECT message. You can determine which tab, if any, is at a specified location by using the TCM_HITTEST message.
In a tab control with the TCS_MULTILINE style, you can determine the current number of rows of tabs by using the TCM_GETROWCOUNT message.

Owner-Drawn Tabs

If a tab control has the TCS_OWNERDRAWFIXED style, the parent window must paint tabs by processing the WM_DRAWITEM message. The tab control sends this message whenever a tab needs to be painted. The *lParam* parameter specifies the address of a DRAWITEMSTRUCT structure, which contains the index of the tab, its bounding rectangle, and the device context in which to draw.
By default, the itemData member of the DRAWITEMSTRUCT structure contains the value of the lParam member of the TC_ITEM structure. However, if you change the amount of application-defined data per tab, the itemData member contains a pointer to the data instead. You can change the amount of application-defined data per tab by using the TCM_SETITEMEXTRA message.
To specify the size of items in a tab control, the parent window must process the WM_MEASUREITEM message. Because all tabs in an owner-drawn tab control are the same size, this message is sent only once. There is no tab control style for owner-drawn tabs of varying size. You can also set the width and height of tabs by using the TCM_SETITEMSIZE message.

Tooltip Controls

You can use a tooltip control to provide a brief description of each tab in a tab control. A tab control that has the TCS_TOOLTIPS style creates a tooltip control

48 when it is created, and when the tab control destroyed, it destroys the tooltip control. You can also create a tooltip control and assign it to a tab control.

If you use a tooltip control with a tab control, the parent window must process the TTN_NEEDTEXT notification message to provide a description of each tab on request.

To use the same tooltip control with more than one tab control, create the tooltip control yourself and assign it to the tab control by using the TCM_SETTOOLTIPS message. You can get the handle of a tab control's current tooltip control by using the TCM_GETTOOLTIPS message. If you use this method, you should *not* use the TCS_TOOLTIPS style. For more information about tooltip controls, see Chapter 19, "Tooltip Controls."

Default Message Processing

The following table summarizes the message processing performed by a tab control. Messages specific to tab controls are discussed elsewhere and are, therefore, not included here.

| Message | Processing performed |
| --- | --- |
| WM_CAPTURECHANGED | Redraws a button to give a raised appearance if a button was pressed and is being held down. |
| WM_CREATE | Allocates and initializes an internal data structure. Creates a tool tip control if the TCS_TOOLTIPS style is specified. |
| WM_DESTROY | Frees resources allocated during WM_CREATE processing. |
| WM_GETDLGCODE | Returns a combination of the DLGC_WANTARROWS and DLGC_WANTCHARS values. |
| WM_GETFONT | Returns the handle of the font used for labels. |
| WM_KEYDOWN | Processes DIRECTION keys and changes the selection, if appropriate. |
| WM_KILLFOCUS | Invalidates the tab that has the focus so that it will be repainted to reflect an unfocused state. |
| WM_LBUTTONDOWN | Forwards the message to the tool tip control, if any. Changes the selection if the user is clicking a tab. If the user is clicking a button, the control redraws the button to give a sunken appearance and captures the mouse. |
| | If the user is clicking either a tab or button and the TCS_FOCUSONBUTTONDOWN style is specified, the control sets the focus to itself. |
| WM_LBUTTONUP | Releases the mouse if a button was pressed. If the cursor was over the button, such that it was held down, the control changes the selection accordingly and redraws the button. |

| | |
|---|---|
| WM_MOUSEMOVE | Forwards the message to the tool tip control, if any. If the TCS_BUTTONS style is specified and the mouse button is being held down after clicking, the control may also redraw the affected button to give it a raised or sunken appearance. |
| WM_NOTIFY | Forwards notification messages sent by the tool tip control. |
| WM_PAINT | Draws the border around the display area (unless the TCS_BUTTONS style is specified) and paints any tabs that intersect the invalid rectangle. |
| | For each tab, the window procedure draws the body of each tab (or sends a WM_DRAWITEM message to the parent window) and then draws a border around the tab. |
| WM_RBUTTONDOWN | Sends an NM_RCLICK notification message to the parent window. |
| WM_SETFOCUS | Invalidates the tab that has the focus so that it will be repainted to reflect a focused state. |
| WM_SETFONT | Sets the font used for labels. |
| WM_SETREDRAW | Sets the state of an internal flag that determines whether the control is repainted when items are inserted and deleted, when the font is changed, and so on. |
| WM_SIZE | Recalculates the positions of tabs and may invalidate part of the tab control to force repainting of some or all tabs. |

Using Tab Controls

This section provides two examples that use tab controls. The first example uses a tab control to switch between multiple pages of text in an application's main window. The second example uses a tab control to switch between multiple pages of controls in a dialog box.

Creating a Tab Control

The example in this section creates a tab control and displays it in the client area of the application's main window. The application displays a third window (a static control) in the display area of the tab control. The parent window positions and sizes the tab control and static control when it processes the WM_SIZE message.
There are seven tabs, one for each day of the week. When the user selects a tab, the application displays the name of the corresponding day in the static control. The following global variables are used in this example.
```
// Global variables.
```

50

```
HINSTANCE g_hinst;      // handle of the application instance
char g_achTemp[256];    // temporary buffer for strings
HWND g_hwndMain;        // main application window
HWND g_hwndTab;         // tab control
HWND g_hwndDisplay;     // handle of the static control in the
                        //    tab control's display area
```

The following function creates the tab control and adds a tab for each day of the week. The names of the days are defined as string resources, consecutively numbered starting with IDS_FIRSTDAY (defined in the application's header file). Both the parent window and the tab control must have the WS_CLIPSIBLINGS window style. The application's initialization function calls this function after creating the main window.

```
// DoCreateTabControl - creates a tab control, sized to fit the
//      specified parent window's client area, and adds some tabs.
// Returns the handle of the tab control.
// hwndParent - parent window (the application's main window)

HWND WINAPI DoCreateTabControl(HWND hwndParent)
{
    RECT rcClient;
    HWND hwndTab;
    TC_ITEM tie;
    int i;

// Get the dimensions of the parent window's client area, and
    // create a tab control child window of that size.
    GetClientRect(hwndParent, &rcClient);
    InitCommonControls();
    hwndTab = CreateWindow(
        WC_TABCONTROL, "",
        WS_CHILD | WS_CLIPSIBLINGS | WS_VISIBLE,
        0, 0, rcClient.right, rcClient.bottom,
        hwndParent, NULL, g_hinst, NULL
        );
    if (hwndTab == NULL)
        return NULL;

// Add tabs for each day of the week.
    tie.mask = TCIF_TEXT | TCIF_IMAGE;
    tie.iImage = -1;
    tie.pszText = g_achTemp;

for (i = 0; i < 7; i++) {
        LoadString(g_hinst, IDS_FIRSTDAY + i,
                g_achTemp, sizeof(g_achTemp));
        if (TabCtrl_InsertItem(hwndTab, i, &tie) == -1) {
            DestroyWindow(hwndTab);
            return NULL;
```

51

```
        }
    }
    return hwndTab;
}
```

The following function creates the static control that occupies the tab control's display area. The application's initialization function calls this function after creating the main window and the tab control.

```
// DoCreateDisplayWindow - creates a child window (a static
//      control) to occupy the tab control's display area.
// Returns the handle of the static control.
// hwndParent - parent window (the application's main window)

HWND WINAPI DoCreateDisplayWindow(HWND hwndParent)
{
    HWND hwndStatic = CreateWindow("STATIC", "",
        WS_CHILD | WS_VISIBLE | WS_BORDER,
        0, 0, CW_USEDEFAULT, CW_USEDEFAULT,
        hwndParent, NULL, g_hinst, NULL);

return hwndStatic;
}
```

Following are the relevant portions of the application's window procedure. The application processes the WM_SIZE message to position and size the tab control and the static control. To determine the appropriate position and size for the static control, this example sends the tab control a TCM_ADJUSTRECT message (by using the TabCtrl_AdjustRect macro).

When a tab is selected, the tab control sends a WM_NOTIFY message, specifying the TCN_SELCHANGE notification message. The application processes this notification message by setting the text of the static control.

```
// MainWindowProc - processes the message for the main window class.
// The return value depends on the message.
// hwnd - identifies the window
// uMsg - identifies the message
// wParam - message-specific parameter
// lParam - message-specific parameter LRESULT CALLBACK MainWindowProc(
        HWND hwnd,
        UINT uMsg,
        WPARAM wParam,
        LPARAM lParam
        )
{
    switch (uMsg) {
        case WM_SIZE: {
                HDWP hdwp;
                RECT rc;
```

52

```
            // Calculate the display rectangle, assuming the
            // tab control is the size of the client area.
            SetRect(&rc, 0, 0,
                    LOWORD(lParam), HIWORD(lParam));
            TabCtrl_AdjustRect(g_hwndTab, FALSE, &rc);

// Size the tab control to fit the client area.
            hdwp = BeginDeferWindowPos(2);
            DeferWindowPos(hdwp, g_hwndTab, NULL, 0, 0,
                LOWORD(lParam), HIWORD(lParam),
                SWP_NOMOVE | SWP_NOZORDER
                );

// Position and size the static control to fit the
            // tab control's display area, and make sure the
            // static control is in front of the tab control.
            DeferWindowPos(hdwp,
                g_hwndDisplay, HWND_TOP, rc.left, rc.top,
                rc.right - rc.left, rc.bottom - rc.top, 0
                );
            EndDeferWindowPos(hdwp);
        }
        break;

case WM_NOTIFY:
        switch (HIWORD(wParam)) {
            case 0:
                .
                .    // menu command processing
                .

case TCN_SELCHANGE: {
                    int iPage = TabCtrl_GetCurSel(g_hwndTab);
                    LoadString(g_hinst, IDS_FIRSTDAY + iPage,
                        g_achTemp, sizeof(g_achTemp));
                    SendMessage(g_hwndDisplay, WM_SETTEXT, 0
                        (LPARAM) g_achTemp);
                }
                break;
        }
        break;

.
        .    // additional message processing
        .

default:
        return DefWindowProc(hwnd, uMsg, wParam, lParam);
}
```

```
    return 0;
}
```

Creating a Tabbed Dialog Box

The example in this section creates a dialog box that uses tabs to provide multiple pages of controls. The main dialog box is a modal dialog box. Each page of controls is defined by a dialog box template that specifies the WS_CHILD style. When a tab is selected, the example creates a modeless dialog box for the incoming page and destroys the dialog box for the outgoing page.

Note In many cases, you can implement multi-page dialog boxes more easily by using property sheets. For more information about property sheets, see Chapter 1, "Property Sheets."

The template for the main dialog box simply defines two button controls. When processing the WM_INITDIALOG message, the dialog box procedure creates a tab control and loads the dialog template resources for each of the child dialog boxes. This information is saved in an application-defined structure, DLGHDR. A pointer to this structure is associated with the dialog box window by using the SetWindowLong function. The structure is defined in the application's header file as follows.

```
define C_PAGES 3 typedef struct tag_dlghdr {
    HWND hwndTab;          // tab control
    HWND hwndDisplay;      // current child dialog box
    RECT rcDisplay;        // display rectangle for the tab control
    DLGTEMPLATE *apRes[C_PAGES];
} DLGHDR;
```

The following function processes the WM_INITDIALOG message for the main dialog box. The function allocates the DLGHDR structure, loads the dialog template resources for the child dialog boxes, and creates the tab control.
The size of each child dialog box is specified by the DLGTEMPLATE structure. The function examines the size of each dialog box, and uses the macro for the TCM_ADJUSTRECT message to calculate an appropriate size for the tab control. It then sizes the dialog box and positions the two buttons accordingly. This example sends the TCM_ADJUSTRECT message by using the TabCtrl_AdjustRect macro.

```
VOID WINAPI OnTabbedDialogInit(HWND hwndDlg)
{
    DLGHDR *pHdr = (DLGHDR *) LocalAlloc(LPTR, sizeof(DLGHDR));
    DWORD dwDlgBase = GetDialogBaseUnits();
    int cxMargin = LOWORD(dwDlgBase) / 4;
    int cyMargin = HIWORD(dwDlgBase) / 8;
    TC_ITEM tie;
    RECT rcTab;
    HWND hwndButton;
```

54

```
RECT rcButton;
int i;

// Save a pointer to the DLGHDR structure.
SetWindowLong(hwndDlg, GWL_USERDATA, (LONG) pHdr);

// Create the tab control.
pHdr->hwndTab = CreateWindow(
    WC_TABCONTROL, "",
    WS_CHILD | WS_CLIPSIBLINGS | WS_VISIBLE,
    0, 0, 100, 100,
    hwndDlg, NULL, g_hinst, NULL
    );

// Add a tab for each of the three child dialog boxes.
tie.mask = TCIF_TEXT | TCIF_IMAGE;
tie.iImage = -1;
tie.pszText = "First";
TabCtrl_InsertItem(pHdr->hwndTab, 0, &tie);
tie.pszText = "Second";
TabCtrl_InsertItem(pHdr->hwndTab, 1, &tie);
tie.pszText = "Third";
TabCtrl_InsertItem(pHdr->hwndTab, 2, &tie);

// Lock the resources for the three child dialog boxes.
pHdr->apRes[0] = DoLockDlgRes(MAKEINTRESOURCE(DLG_FIRST));
pHdr->apRes[1] = DoLockDlgRes(MAKEINTRESOURCE(DLG_SECOND));
pHdr->apRes[2] = DoLockDlgRes(MAKEINTRESOURCE(DLG_THIRD));

// Determine the bounding rectangle for all child dialog boxes.
SetRectEmpty(&rcTab);
for (i = 0; i < C_PAGES; i++) {
    if (pHdr->apRes[i]->cx > rcTab.right)
        rcTab.right = pHdr->apRes[i]->cx;
    if (pHdr->apRes[i]->cy > rcTab.bottom)
        rcTab.bottom = pHdr->apRes[i]->cy;
}
rcTab.right = rcTab.right * LOWORD(dwDlgBase) / 4;
rcTab.bottom = rcTab.bottom * HIWORD(dwDlgBase) / 8;

// Calculate how large to make the tab control, such that
// the display area can accomodate all the child dialog boxes.
TabCtrl_AdjustRect(pHdr->hwndTab, TRUE, &rcTab);
OffsetRect(&rcTab, cxMargin - rcTab.left,
        cyMargin - rcTab.top);

// Calculate the display rectangle.
CopyRect(&pHdr->rcDisplay, &rcTab);
TabCtrl_AdjustRect(pHdr->hwndTab, FALSE, &pHdr->rcDisplay);
```

55

```
    // Set the size and position of the tab control, buttons,
    // and dialog box.
    SetWindowPos(pHdr->hwndTab, NULL, rcTab.left, rcTab.top,
            rcTab.right - rcTab.left, rcTab.bottom - rcTab.top,
            SWP_NOZORDER);

// Move the first button below the tab control.
    hwndButton = GetDlgItem(hwndDlg, BTN_CLOSE);
    SetWindowPos(hwndButton, NULL,
            rcTab.left, rcTab.bottom + cyMargin, 0, 0,
            SWP_NOSIZE | SWP_NOZORDER);

// Determine the size of the button.
    GetWindowRect(hwndButton, &rcButton);
    rcButton.right -= rcButton.left;
    rcButton.bottom -= rcButton.top;

// Move the second button to the right of the first.
    hwndButton = GetDlgItem(hwndDlg, BTN_TEST);
    SetWindowPos(hwndButton, NULL,
        rcTab.left + rcButton.right + cxMargin,
        rcTab.bottom + cyMargin, 0, 0,
        SWP_NOSIZE | SWP_NOZORDER);

// Size the dialog box.
    SetWindowPos(hwndDlg, NULL, 0, 0,
        rcTab.right + cyMargin +
        2 * GetSystemMetrics(SM_CXDLGFRAME),
        rcTab.bottom + rcButton.bottom + 2 * cyMargin +
        2 * GetSystemMetrics(SM_CYDLGFRAME) +
        GetSystemMetrics(SM_CYCAPTION),
        SWP_NOMOVE | SWP_NOZORDER);

// Simulate selecting of the first item.
    OnSelChanged(hwndDlg);
}

// DoLockDlgRes - loads and locks a dialog template resource.
// Returns a pointer to the locked resource.
// lpszResName - name of the resource DLGTEMPLATE * WINAPI DoLockDlgRes(LPCSTR lpszResName)
{
    HRSRC hrsrc = FindResource(NULL, lpszResName, RT_DIALOG);
    HGLOBAL hglb = LoadResource(g_hinst, hrsrc);
    return (DLGTEMPLATE *) LockResource(hglb);
}
```

The following function processes the TCN_SELCHANGE notification message for the main dialog box. The function destroys the dialog box for the outgoing page, if any. It then uses the CreateDialogIndirect function to create a modeless dialog box for the incoming page.

```
// OnSelChanged - processes the TCN_SELCHANGE notification.
// hwndDlg - handle of the parent dialog box VOID WINAPI OnSelChanged(HWND hwndDlg)
{
    DLGHDR *pHdr = (DLGHDR *) GetWindowLong(
        hwndDlg, GWL_USERDATA);
    int iSel = TabCtrl_GetCurSel(pHdr->hwndTab);

// Destroy the current child dialog, if any.
    if (pHdr->hwndDisplay != NULL)
        DestroyWindow(pHdr->hwndDisplay);

// Create the new child dialog box.
    pHdr->hwndDisplay = CreateDialogIndirect(g_hinst,
        pHdr->apRes[iSel], hwndDlg, ChildDialogProc);
}
```

The following function processes the WM_INITDIALOG message for each of the child dialog boxes. You cannot specify the position of a dialog box created using the CreateDialogIndirect function. This function uses the SetWindowPos function to position the child dialog within the tab control's display area.

```
// OnChildDialogInit - Positions the child dialog box to fall
//      within the display area of the tab control.

VOID WINAPI OnChildDialogInit(HWND hwndDlg)
{
    HWND hwndParent = GetParent(hwndDlg);
    DLGHDR *pHdr = (DLGHDR *) GetWindowLong(
        hwndParent, GWL_USERDATA);
    SetWindowPos(hwndDlg, HWND_TOP,
        pHdr->rcDisplay.left, pHdr->rcDisplay.top,
        0, 0, SWP_NOSIZE);
}
```

Reference

The messages, notification messages, and structures used with tab controls can be grouped as follows:

Tabs and Tab Attributes
TC_ITEM
TC_ITEMHEADER
TCM_DELETEALLITEMS
TCM_DELETEITEM
TCM_GETITEM

TCM_INSERTITEM
TCM_SETITEM
TCM_SETITEMEXTRA

Tab Selection
TCM_GETCURSEL
TCM_SETCURSEL

57

TCN_SELCHANGE
TCN_SELCHANGING
Tab Size and Position
TC_HITTESTINFO
TCM_ADJUSTRECT
TCM_GETITEMRECT
TCM_GETROWCOUNT
TCM_HITTEST
TCM_SETITEMSIZE
TCM_SETPADDING

Miscellaneous
TC_KEYDOWN
TCM_GETIMAGELIST
TCM_GETITEMCOUNT
TCM_GETTOOLTIPS
TCM_REMOVEIMAGE
TCM_SETIMAGELIST
TCM_SETTOOLTIPS
TCN_KEYDOWN

Messages

An application sends messages to add tabs and to otherwise control the appearance and behavior of a tab control. Each message has a corresponding macro, which you can use instead of sending the message explicitly.

TCM_ADJUSTRECT

```
TCM_ADJUSTRECT
wParam = (WPARAM) (BOOL) fLarger;   // operation to perform
lParam = (LPARAM) (LPRECT) prc;     // rectangle to adjust // Corresponding macro
VOID TabCtrl_AdjustRect(HWND hwnd, BOOL fLarger, RECT FAR* prc);
```

Calculates a tab control's display area given a window rectangle, or calculates the window rectangle that would correspond to a given display area. You can send this message explicitly or by using the TabCtrl_AdjustRect macro.
• No return value.

*hwnd*
　Handle of the tab control.

*fLarger*
　Operation to perform. If this parameter is TRUE, *prc* specifies a display rectangle and receives the corresponding window rectangle. If this parameter is FALSE, *prc* specifies a window rectangle and receives the corresponding display area.

*prc*
　Address of a RECT structure that specifies the given rectangle and receives the calculated rectangle.

TCM_DELETEALLITEMS

```
TCM_DELETEALLITEMS
wParam = 0;         // not used; must be zero
```

58

```
lParam = 0;        // not used; must be zero

// Corresponding macro
BOOL TabCtrl_DeleteAllItems(HWND hwnd);
```

Removes all items from a tab control. You can send this message explicitly or by using the TabCtrl_DeleteAllItems macro.
- Returns TRUE if successful or FALSE otherwise.

*hwnd*
    Handle of the tab control.

TCM_DELETEITEM

```
TCM_DELETEITEM
wParam = (WPARAM) (int) iItem;   // index of item to delete
lParam = 0;                      // not used; must be zero // Corresponding macro
BOOL TabCtrl_DeleteItem(HWND hwnd, int iItem);
```

Removes an item from a tab control. You can send this message explicitly or by using the TabCtrl_DeleteItem macro.
- Returns TRUE if successful or FALSE otherwise.

*hwnd* and *iItem*
    Handle of the tab control, and the index of the item to delete.

TCM_GETCURSEL

```
TCM_GETCURSEL
wParam = 0;    // not used; must be zero
lParam = 0;    // not used; must be zero // Corresponding macro
BOOL TabCtrl_GetCurSel(HWND hwnd);
```

Determines the currently selected tab in a tab control. You can send this message explicitly or by using the TabCtrl_GetCurSel macro.
- Returns the index of the selected tab if successful or −1 if no tab is selected.

*hwnd*
    Handle of the tab control.

TCM_GETIMAGELIST

59

```
TCM_GETIMAGELIST
wParam = 0;    // not used; must be zero
lParam = 0;    // not used; must be zero // Corresponding macro
HIMAGELIST TabCtrl_GetImageList(HWND hwnd);
```

Retrieves the image list associated with a tab control. You can send this message explicitly or by using the TabCtrl_GetImageList macro.
- Returns the handle of the image list if successful or NULL otherwise.

TCM_GETITEM

```
TCM_GETITEM
wParam = (WPARAM) (int) iItem;           // index of the item
lParam = (LPARAM) (TC_ITEM FAR *) pitem; // TC_ITEM structure // Corresponding macro
BOOL TabCtrl_GetItem(HWND hwnd, int iItem, TC_ITEM FAR* pitem);
```

Retrieves information about a tab in a tab control. You can send this message explicitly or by using the TabCtrl_GetItem macro.
- Returns TRUE if successful or FALSE otherwise.

*hwnd* and *iItem*
  Handle of the tab control, and the index of the tab.

*pitem*
  Address of a TC_ITEM structure that specifies the information to retrieve and receives information about the tab. When the message is sent, the mask member specifies which attributes to return.

If the mask member specifies the TCIF_TEXT value, the pszText member must contain the address of the buffer that receives the item text and the cchTextMax member must specify the size of the buffer.

TCM_GETITEMCOUNT

```
TCM_GETITEMCOUNT
wParam = 0;    // not used; must be zero
lParam = 0;    // not used; must be zero // Corresponding macro
int TabCtrl_GetItemCount(HWND hwnd);
```

Retrieves the number of tabs in the tab control. You can send this message explicitly or by using the TabCtrl_GetItemCount macro.

60

- Returns the number of items if successful or zero otherwise.

*hwnd*
    Handle of the tab control.

TCM_GETITEMRECT

```
TCM_GETITEMRECT
wParam = (WPARAM) (int) iItem;        // Index of the tab
lParam = (LPARAM) (RECT FAR *) prc;   // RECT structure // Corresponding macro
BOOL TabCtrl_GetItemRect(HWND hwnd, int iItem, RECT FAR* prc);
```

Retrieves the bounding rectangle for a tab in a tab control. You can send this message explicitly or by using the TabCtrl_GetItemRect macro.
- Returns TRUE if successful, FALSE otherwise.

*hwnd* and *iItem*
    Handle of the tab control, and the index of the tab.

*prc*
    Address of a RECT structure that receives the bounding rectangle of the tab, in viewport coordinates.

TCM_GETROWCOUNT

```
TCM_GETROWCOUNT
wParam = 0;   // not used; must be zero
lParam = 0;   // not used; must be zero // Corresponding macro
int TabCtrl_GetRowCount(HWND hwnd);
```

Retrieves the current number of rows of tabs in a tab control. You can send this message explicitly or by using the TabCtrl_GetRowCount macro.
- Returns the number of rows of tabs.

*hwnd*
    Handle of the tab control.

Only tab controls that have the TCS_MULTILINE style can have multiple rows of tabs.

TCM_GETTOOLTIPS

```
TCM_GETTOOLTIPS
```

61

```
wParam = 0;   // not used; must be zero
lParam = 0;   // not used; must be zero // Corresponding macro
int TabCtrl_GetToolTips(HWND hwnd);
```

Retrieves the handle of the tool tip control associated with a tab control. You can send this message explicitly or by using the TabCtrl_GetToolTips macro.
- Returns the handle of the tool tip control if successful or NULL otherwise.

*hwnd*
    Handle of the tab control.

A tab control creates a tool tip control if it has the TCS_TOOLTIPS style. You can also assign a tool tip control to a tab control by using the TCM_SETTOOLTIPS message.

TCM_HITTEST

```
TCM_HITTEST
wParam = 0;   // not used; must be zero
lParam = (LPARAM) (TC_HITTESTINFO FAR *) pinfo;

// Corresponding macro
int TabCtrl_HitTest(HWND hwnd, TC_HITTESTINFO FAR* pinfo);
```

Determines which tab, if any, is at a specified screen position. You can send this message explicitly or by using the TabCtrl_HitTest macro.
- Returns the index of the tab or −1 if no tab is at the specified position.

*hwnd*
    Handle of the tab control.

*pinfo*
    Address of a TC_HITTESTINFO structure that specifies the screen position to test.

TCM_INSERTITEM

```
TCM_INSERTITEM
wParam = (WPARAM) (int) iItem;                    // tab index
lParam = (LPARAM) (const TC_ITEM FAR*) pitem;     // item information // Corresponding macro
int TabCtrl_InsertItem(HWND hwnd, int iItem,
        const TC_ITEM FAR* pitem);
```

Inserts a new tab in a tab control. You can send this message explicitly or by using the TabCtrl_InsertItem macro.
- Returns the index of the new tab if successful or −1 otherwise.

*hwnd* and *iItem*
    Handle of the tab control, and the index of the new tab.

*pitem*
    Address of a TC_ITEM structure that specifies the attributes of the tab.

TCM_REMOVEIMAGE

```
TCM_REMOVEIMAGE
wParam = (WPARAM) (int) iImage;   // index of image to remove
lParam = 0;                       // not used; must be zero // Corresponding macro
void TabCtrl_RemoveImage(HWND hwnd, int iImage);
```

Removes an image from a tab control's image list. You can send this message explicitly or by using the TabCtrl_RemoveImage macro.
- No return value.

*hwnd* and *iImage*
    Handle of the tab control, and the index of the image to remove.

The tab control updates each tab's image index so that each tab remains associated with the same image it had been.

TCM_SETCURSEL

```
TCM_SETCURSEL
wParam = (WPARAM) (int) iItem;    // index of tab to select
lParam = 0;                       // not used; must be zero // Corresponding macro
int TabCtrl_SetCurSel(HWND hwnd, int iItem);
```

Selects a tab in a tab control. You can send this message explicitly or by using the TabCtrl_SetCurSel macro.
- Returns the index of the previously selected tab if successful or −1 otherwise.

*hwnd* and *iItem*
    Handle of the tab control, and the index of the tab to select.

A tab control does not send a TCN_SELCHANGING or TCN_SELCHANGE notification message when a tab is selected using this message.

TCM_SETIMAGELIST

```
TCM_SETIMAGELIST
wParam = 0;                                  // not used; must be zero
lParam = (LPARAM) (HIMAGELIST) himl;         // new image list handle // Corresponding macro
BOOL TabCtrl_SetImageList(HWND hwnd, HIMAGELIST himl);
```

Assigns an image list to a tab control. You can send this message explicitly or by using the TabCtrl_SetImageList macro.
- Returns the handle of the previous image list or NULL if there is no previous image list.

*hwnd*
    Handle of the tab control.

*himl*
    Handle of the image list to assign to the tab control.

TCM_SETITEM

```
TCM_SETITEM
wParam = (WPARAM) (int) iItem;               // index of tab
lParam = (LPARAM) (TC_ITEM FAR *) pitem;     // new attributes // Corresponding macro
BOOL TabCtrl_SetItem(HWND hwnd, int iItem, TC_ITEM FAR* pitem);
```

Sets some or all of a tab's attributes. You can send this message explicitly or by using the TabCtrl_SetItem macro.
- Returns TRUE if successful or FALSE otherwise.

*hwnd* and *iItem*
    Handle of the tab control, and the index of the item.

*pitem*
    Address of an TC_ITEM structure that contains the new item attributes. The mask member specifies which attributes to set.
    If the mask member specifies the LVIF_TEXT value, the pszText member is the address of a null-terminated string and the cchTextMax member is ignored.

TCM_SETITEMEXTRA

```
TCM_SETITEMEXTRA
wParam = (WPARAM) (int) cb;   // number of extra bytes per tab
```

64

```
lParam = 0;              // not used; must be zero

// Corresponding macro
BOOL TabCtrl_SetItemExtra(HWND hwnd, int cb);
```

Sets the number of bytes per tab reserved for application-defined data in a tab control. You can send this message explicitly or by using the TabCtrl_SetItemExtra macro.
- Returns TRUE if successful or FALSE otherwise.

*hwnd*
    Handle of the tab control.

*cb*
    Number of extra bytes.

By default, the number of extra bytes is four. An application that changes the number of extra bytes cannot use the TC_ITEM structure to retrieve and set the application-defined data for a tab. Instead, you must define a new structure consisting of the TC_ITEMHEADER structure followed by application-defined members.
An application should only change the number of extra bytes when a tab control does not contain any tabs.

TCM_SETITEMSIZE

```
TCM_SETITEMSIZE
wParam = 0;                       // not used; must be zero
lParam = MAKELPARAM(cx, cy);      // width and height of tab // Corresponding macro
DWORD TabCtrl_SetItemSize(HWND hwnd, int cx, int cy);
```

Sets the width and height of tabs in a fixed-width or owner-drawn tab control. You can send this message explicitly or by using the TabCtrl_SetItemSize macro.
- Returns the old width and height. The width is in the low-order word of the return value, and the height is in the high-order word.

*hwnd*
    Handle of the tab control.

*cx* and *cy*
    New width and height, in pixels.

TCM_SETPADDING

```
TCM_SETPADDING
wParam = 0;                       // not used; must be zero
lParam = MAKELPARAM(cx, cy);      // horizontal and vertical padding
```

```
// Corresponding macro
void TabCtrl_SetPadding(HWND hwnd, int cx, int cy);
```

Sets the amount of space (padding) around each tab's icon and label in a tab control. You can send this message explicitly or by using the TabCtrl_SetPadding macro.
- No return value.

*hwnd*
    Handle of the tab control.

*cx* and *cy*
    Amount of horizontal and vertical padding, in pixels.

TCM_SETTOOLTIPS

```
TCM_SETTOOLTIPS
wParam = (WPARAM) (HWND) hwndTT;   // handle of tool tip control
lParam = 0;                        // not used; must be zero // Corresponding macro
void TabCtrl_SetToolTips(HWND hwndTab, HWND hwndTT);
```

Assigns a tool tip control to a tab control. You can send this message explicitly or by using the TabCtrl_SetToolTips macro.
- No return value.

*hwndTab*
    Handle of the tab control.

*hwndTT*
    Handle of the tool tip control.

You can get the tool tip control associated with a tab control by using the TCM_GETTOOLTIPS message.

Notification Messages

A tab control sends notification messages in the form of WM_NOTIFY messages when the user selects a tab.

TCN_KEYDOWN

```
TCN_KEYDOWN
pnm = (TC_KEYDOWN FAR *) lParam;
```

Notifies a tab control's parent window that a key has been pressed. This notification message is sent in the form of a WM_NOTIFY message.
- No return value.

*pnm*
    Address of a TC_KEYDOWN structure.

TCN_SELCHANGE

```
TCN_SELCHANGE
idTabCtl = (int) LOWORD(wParam);
hwndTabCtl = (HWND) lParam;
```

Notifies a tab control's parent window that the currently selected tab has changed. This notification message is sent in the form of a WM_NOTIFY message.
- No return value.

To determine the newly selected tab, use the TabCtrl_GetCurSel macro.

TCN_SELCHANGING

```
TCN_SELCHANGE
idTabCtl = (int) LOWORD(wParam);
hwndTabCtl = (HWND) lParam;
```

Notifies a tab control's parent window that the currently selected tab is about to change. This notification message is sent in the form of a WM_NOTIFY message.
- Returns TRUE to prevent the selection from changing or FALSE to allow the selection to change.

To determine the currently selected tab, use the TabCtrl_GetCurSel macro.

Structures

The following structures are used specifically with tab control messages.

TC_HITTESTINFO

```
typedef struct _TC_HITTESTINFO {
    POINT pt;     // position to hit test, in client coordinates
    UINT  flags;  // receives results of hit test; see below
} TC_HITTESTINFO;
```

Contains information about a hit test. This structure is used with the TCM_HITTEST message.

flags
    Variable that receives the results of a hit test. The tab control sets this member to one of these values:

TCHT_NOWHERE          The position is not over a tab.

| | |
|---|---|
| TCHT_ONITEM | The position is over a tab, but not over its icon or its text. For owner-drawn tab controls, this value is specified if the position is anywhere over a tab. |
| TCHT_ONITEMICON | The position is over a tab's icon. |
| TCHT_ONITEMLABEL | The position is over a tab's text. |

TCHT_ONITEM is a bitwise OR operation on the TCHT_ONITEMICON and TCHT_ONITEMLABEL values.

TC_ITEM

```
typedef struct _TC_ITEM {
    UINT mask;           // see below
    UINT lpReserved1;    // reserved; do not use
    UINT lpReserved2;    // reserved; do not use
    LPSTR pszText;       // see below
    int cchTextMax;      // see below
    int iImage;          // see below
    LPARAM lParam;       // see below
} TC_ITEM;
```

Specifies or receives the attributes of a tab. This structure is used with the TCM_INSERTITEM, TCM_GETITEM, and TCM_SETITEM messages.

mask
    Value specifying which members to retrieve or set. This member can be TCIF_ALL (meaning all members), zero, or more of these values:

| | |
|---|---|
| TCIF_TEXT | The pszText member is valid. |
| TCIF_IMAGE | The iImage member is valid. |
| TCIF_PARAM | The lParam member is valid. | pszText
    Address of a null-terminated string containing the tab text if the structure contains information about a tab. If the structure is receiving information, this member specifies the address of the buffer that receives the tab text.

cchTextMax
    Size of the buffer pointed to by the pszText member. This member is ignored if the structure is not receiving information.

iImage
    Index into the tab control's image list, or −1 if there is no image for the tab.

lParam
    Application-defined data associated with the tab. If there are more or less than four bytes of application-defined data per tab, an application must define a structure and use it instead of the TC_ITEM structure. The first member of the application-defined structure must be a TC_ITEMHEADER structure.

TC_ITEMHEADER

```
typedef struct _TC_ITEMHEADER {
    UINT mask;           // same as in the TC_ITEM structure
    UINT lpReserved1;    // reserved; do not use
    UINT lpReserved2;    // reserved; do not use
    LPSTR pszText;       // same as in the TC_ITEM structure
    int cchTextMax;      // same as in the TC_ITEM structure
    int iImage;          // same as in the TC_ITEM structure
} TC_ITEMHEADER;
```

Specifies or receives the attributes of a tab. This structure is the same as the TC_ITEM structure, except that it does not include an lParam member for application-defined data.
An application cannot use the TC_ITEM structure to retrieve or set the application-defined data for tabs in a tab control with more or less than four extra bytes per tab. Instead, you should define a structure consisting of the TC_ITEMHEADER structure followed by application-defined data.
To set the number of extra bytes per tab, use the TCM_SETITEMEXTRA message.

TC_KEYDOWN

```
typedef struct _TC_KEYDOWN {
    NMHDR hdr;     // notification header
    WORD wVKey;    // virtual key code
    UINT flags;    // see below
} TC_KEYDOWN;
```

Contains information about a key press in a tab control. This structure is used with the TCN_KEYDOWN notification message.
flags
    Same as the lParam parameter of the WM_KEYDOWN mesage

Constants

The following sections describe the constants used with tab controls:

Tab Control Styles

The following window styles are specific to tab controls.

| | |
|---|---|
| TCS_BUTTONS | Specifies that tabs appear as buttons and no border is drawn around the display area. |
| TCS_FIXEDWIDTH | Specifies that all tabs are the same width. This style cannot be combined with the TCS_RIGHTJUSTIFY style. |

| | |
|---|---|
| TCS_FOCUSNEVER | Specifies that the tab control never receives the input focus. |
| TCS_FOCUSONBUTTONDOWN | Specifies that tabs receive the input focus when clicked. |
| TCS_FORCEICONLEFT | Aligns icons with the left edge of each fixed-width tab. This style can only be used with the TCS_FIXEDWIDTH style. |
| TCS_FORCELABELLEFT | Aligns labels with the left edge of each fixed-width tab (that is, it displays the label immediately to the right of the icon instead of centering it).<br><br>This style can only be used with the TCS_FIXEDWIDTH style, and it implies the TCS_FORCEICONLEFT style. |
| TCS_MULTILINE | Displays multiple rows of tabs, if necessary, so that all tabs are visible at once. |
| TCS_OWNERDRAWFIXED | Specifies that the parent window is responsible for drawing tabs. |
| TCS_RAGGEDRIGHT | Does not stretch each row of tabs to fill the entire width of the control. This style is the default. |
| TCS_RIGHTJUSTIFY | Increases the width of each tab, if necessary, such that each row of tabs fills the entire width of the tab control.<br><br>This window style is ignored unless the TCS_MULTILINE style is also specified. |
| TCS_SHAREIMAGELISTS | Does not destroy the image list when the control is destroyed, so that the same image list can be assigned to multiple tab controls. |
| TCS_SINGLELINE | Displays only one row of tabs. The user can scroll to see more tabs, if necessary. This style is the default. |
| TCS_TABS | Tabs appear as tabs, and a border is drawn around the display area. This style is the default. |
| TCS_TOOLTIPS | The tab control has a tool tip control associated with it. For more information about tool tip controls, see Chapter 19, "Tooltip Controls." |

70

Image Lists

About Image Lists

An *image list* is a collection of same-sized images, each of which can be referred to by its index. Image lists are used to efficiently manage large sets of icons or bitmaps. All images in an image list are contained in a single, wide bitmap in screen device format. An image list may also include a monochrome bitmap that contains masks used to draw images transparently (icon style). The Microsoft® Win32® application programming interface (API) provides image list functions that enable you to draw images, create and destroy image lists, add and remove images, replace images, merge images, and drag images.

To use the image list functions, you must include the common control header file in your source code files, and you must link with the common control export library. In addition, before calling any image list function, you must use the InitCommonControls function to ensure that the common control dynamic-link library (DLL) is loaded.

Types

There are two types of image lists: nonmasked and masked. A *nonmasked image list* consists of a color bitmap that contains one or more images. A *masked image list* consists of two bitmaps of equal size. The first is a color bitmap that contains the images, and the second is a monochrome bitmap that contains a series of masks—one for each image in the first bitmap.

When a nonmasked image is drawn, it is simply copied into the target device context (DC) that is, it is drawn over the existing background color of the (DC). When a masked image is drawn, the bits of the image are combined with the bits of the mask, typically to produce transparent areas in the bitmap where the background color of the target DC shows through. There are several drawing styles that you can specify when drawing a masked image. For example, you can specify that the image be dithered to indicate a selected object. For more information about drawing images, see "Drawing Images" later in this chapter.

71

Image List Creation

You create an image list by calling the ImageList_Create function. The parameters include the type of image list to create, the dimensions of each image, and the number of images you intend to add to the list. For a nonmasked image list, the function creates a single bitmap large enough to hold the specified number of images of the given dimensions. Next, it creates a screen-compatible DC and selects the bitmap into it. For a masked image list, the function creates two bitmaps and two screen-compatible DCs. It selects the image bitmap into one DC and the mask bitmap into the other.

The initial size of an image list is determined by the size values you specify in ImageList_Create. If you attempt to add more images than you initially specified, the image list automatically grows to accommodate the additional images. In the ImageList_Create function, you specify the amount of images by which the image list can grow.

If ImageList_Create succeeds, it returns a handle of the HIMAGELIST type. You use this handle in other image list functions to access the image list and manage the images. You can add and remove images, copy images from one image list to another, and merge images from two different image lists. When you no longer need an image list, you can destroy it by specifying its handle in a call to the ImageList_Destroy function.

Adding and Removing Images

You can add bitmapped images, icons, or cursors to an image list. You add bitmapped images by specifying the handles of two bitmaps in a call to the ImageList_Add function. The first bitmap contains one or more images to add to the image bitmap, and the second bitmap contains the masks to add to the mask bitmap. For nonmasked image lists, the second bitmap handle is ignored; you can set it to NULL.

The ImageList_AddMasked function also adds bitmapped images to a masked image list. This function is similar to ImageList_Add, except that you do not specify a mask bitmap. Instead, you specify a color that the system combines with the image bitmap to automatically generate the masks. Each pixel of the specified color in the image bitmap is changed to black, and the corresponding bit in the mask is set to one. As a result, any pixel in the image that matches the specified color is transparent when the image is drawn.

The ImageList_AddIcon function adds an icon or cursor to an image list. If the image list is masked, ImageList_AddIcon adds the mask provided with the icon or cursor to the mask bitmap. If the image list is nonmasked, the mask for the icon or cursor is not used when drawing the image.

You can create an icon based on an image and mask in an image list by using the ImageList_ExtractIcon function. The function returns the handle of the new icon. The ImageList_Add, ImageList_AddMasked, and ImageList_AddIcon functions assign an index to each image as it is added to an image list. The indexes are zero-based; that is, the first image in the list has an index of zero, the next has an index of one, and so on. After adding a single image, the functions return the index of the image. When more than one image is added at a time, the functions return the index of the first image.

The ImageList_AddFromImageList function copies an image from one image list to another. The images in both lists must be the same size. The ImageList_Remove function removes an image from an image list.

Replacing and Merging Images

The ImageList_Replace and ImageList_ReplaceIcon functions replace an image in an image list with a new image. ImageList_Replace replaces an image with a bitmapped image and mask, and ImageList_ReplaceIcon replaces an image with an icon or cursor.

The ImageList_Merge function merges two images, storing the new image in a new image list. The new image is created by drawing the second image transparently over the first. The mask for the new image is the result of performing a logical OR operation on the bits of the masks for the two existing images.

Drawing Images

To draw an image, you use the ImageList_Draw or ImageList_Draw2 function. You specify the handle of an image list, the index of the image to draw, the handle of the destination DC, a location within the DC, and one or more drawing styles.

When you specify the ILD_TRANSPARENT style, the ImageList_Draw or ImageList_Draw2 function uses a two-step process to draw a masked image. First, it performs a logical AND operation on the bits of the image and the bits of the mask. Next, it performs a logical XOR operation on the results of the first operation and the background bits of the destination DC. This process creates transparent areas in the resulting image (that is, each white bit in the mask causes the corresponding bit in the resulting image to be transparent).

Before drawing a masked image on a solid color background, you should use the ImageList_SetBkColor function to set the background color of the image list to the same color as the destination. Setting the color eliminates the need to create transparent areas in the image and enables the ImageList_Draw or ImageList_Draw2 function to simply copy the image to the destination DC, resulting in a significant increase in performance. To draw the image, specify the ILD_NORMAL style in a call to ImageList_Draw or ImageList_Draw2.

You can set the background color for a masked image list at any time so that it draws correctly on any solid background. Setting the background color to CLR_NONE causes images to be drawn transparently by default. To retrieve the background color of an image list, use the ImageList_GetBkColor function.

The ILD_BLEND25, ILD_BLEND50, and ILD_BLEND75 styles dither the image with the system highlight color. These styles are useful if you use a masked image to represent an object that the user can select. For example, you can use the ILD_BLEND50 style to draw the image when the user selects it.

A nonmasked image is copied to the destination DC using the SRCCOPY raster operation. The colors in the image appear the same regardless of the background color of the DC. The drawing styles specified in the ImageList_Draw or

73

ImageList_Draw2 function also have no effect on the appearance of a nonmasked image.

Overlay Mask

Every image list includes a list of images to use as overlay masks. An overlay mask is an image drawn transparently over another image. Any image can be used as an overlay mask. You can specify up to four overlay masks per image list.
You add the index of an image to the list of overlay masks by using the ImageList_SetOverlayImage function, specifying the handle of the image list, the index of an image, and the index of an overlay mask. Note that the indices for the overlay masks are one-based rather than zero-based.
You draw an overlay mask over an image using a single call to the ImageList_Draw or ImageList_Draw2 function. The parameters include the index of the image to draw and the ILD_OVERLAYMASK drawing style combined with the index of an overlay mask. You must use the INDEXTOOVERLAYMASK macro to specify the index of the overlay mask.

Dragging Images

The Win32 API includes functions for dragging an image on the screen. The dragging functions move an image smoothly, in color, and without any flashing of the cursor. Both masked and unmasked images can be dragged.
The ImageList_StartDrag function begins a drag operation. The parameters include the handle of the image list and the index of the image to drag. The function creates a new image by combining the specified image with the current mouse cursor. Because the dragging functions use the new image during a drag operation, you should use the ShowCursor function to hide the actual mouse cursor after calling ImageList_StartDrag. Otherwise, the system may appear to have two mouse cursors for the duration of the drag operation.
The parameters of ImageList_StartDrag also include the location of the hot spot within the image and the initial location of the image. The hot spot is a single pixel that the dragging functions recognize as the exact screen location of the image. When ImageList_StartDrag draws the image in the initial location, it draws the image such that the hot spot occupies the specified location. So does the ImageList_DragMove function, which moves an image to a new location. Typically, an application sets the hot spot so that it coincides with the hot spot of the mouse cursor.
You also specify a window handle when you call ImageList_StartDrag. The dragging functions draw the image in the DC associated with the given window. Note, however, that the coordinates that specify the position of the image during a drag operation are relative to the window's upperleft corner, not the client area. This means you must compensate for the widths of window elements such as the title bar and menu bar when specifying the coordinates. If you specify NULL instead of a window handle when calling ImageList_StartDrag, the dragging functions draw the image in the DC associated with the desktop window and the coordinates are relative to the upperleft corner of the screen.

The ImageList_StartDrag function locks all other updates to the screen until you end the drag operation by using the ImageList_EndDrag function.
If you need to do any drawing during a drag operation, such as highlighting the target of a drag-and-drop operation, you can use the GetDCEx function with the DCX_LOCKWINDOWUPDATE value to retrieve a DC that allows you to draw. You must be careful, however, not to obliterate the dragged image.

Image Information

The Win32 API includes a number of functions that retrieve information from an image list. The ImageList_GetImageInfo function fills an IMAGEINFO structure with information about a single image, including the handles of the image and mask bitmaps, the number of color planes and bits per pixel, and the bounding rectangle of the image within the image bitmap. You can use this information to directly manipulate the bitmaps for the image.
The ImageList_GetImageRect function retrieves the bounding rectangle of an image, and the ImageList_GetImageCount function retrieves the number of images in an image list.

Using Image Lists

This section provides examples demonstrating how to perform the following tasks:
- Create an image list.
- Add images to an image list.
- Drag images on the display.

Creating an Image List

To create an image list, use the ImageList_Create function, specifying the type of image list to create (unmasked or masked); the width and height, in pixels, of the images; the number of images you intend to add to the image list; and the amount of images by which the list can grow when it is resized to accommodate additional images. The common control DLL contains the executable code for the image list functions. You must ensure that the library is loaded by using the InitCommonControls function before making any calls to image list functions.
The following example creates a masked image list and uses the ImageList_AddIcon function to add two icons to the list.

```
// AddIconsToImageList - creates a masked image list and adds some
//      icons to it.
// Returns the handle of the new image list.
// hinst - handle of the application instance
//
// Global variables and constants
//      g_nBird and g_nTree - indexes of the images
//      CX_ICON and CY_ICON - width and height of the icon
//      NUM_ICONS - number of icons to add to the image list
```

```
extern int g_nBird, g_nTree;

#define CX_ICON  32
#define CY_ICON  32
#define NUM_ICONS 3

HIMAGELIST AddIconsToImageList(HINSTANCE hinst)
{
    HIMAGELIST himlIcons;   // handle of new image list
    HICON hicon;            // handle of icon // Ensure that the common control DLL is loaded.
    InitCommonControls();

// Create a masked image list large enough to hold the icons.
    himlIcons = ImageList_Create(CX_ICON, CY_ICON, TRUE, NUM_ICONS, 0);

// Load the icon resources, add the icons to the image list,
    // and free the icon handles.
    hicon = LoadIcon(hinst, MAKEINTRESOURCE(IDI_BIRD));
    g_nBird = ImageList_AddIcon(himlIcons, hicon);
    DeleteObject(hicon);

hicon = LoadIcon(hinst, MAKEINTRESOURCE(IDI_TREE));
    g_nTree = ImageList_AddIcon(himlIcons, hicon);
    DeleteObject(hicon);

return himlIcons;
}
```

Dragging an Image

Dragging an image involves calls to three functions: ImageList_StartDrag, ImageList_DragMove, and ImageList_EndDrag. The ImageList_StartDrag function begins a drag operation by combining an image with the current mouse cursor, setting a hot spot in the image, and drawing the image in its initial position. The function also prevents the system from updating any other parts of the display. The ImageList_DragMove function drags the image to a new location. The ImageList_EndDrag function ends a drag operation, permitting the system to update any part of the display.

The remainder of this section provides an example using four functions that demonstrates how to drag an image. The first function shows how to draw an image in a window's client area, and subsequent functions show how to drag the image.

76

Drawing the Image

The following function draws an image and saves the client coordinates of the image's bounding rectangle. A subsequent function uses the bounding rectangle to determine whether the user has clicked the image.

```
// DrawTheImage - draws an image transparently and saves
//      the bounding rectangle of the drawn image
// Returns TRUE if successful or FALSE otherwise.
// hwnd - handle of the window in which to draw the image
// himl - handle of the image list that contains the image
// cx and cy - client coordinates for the upper left corner of the image
//
// Global variables and constants
//      g_nImage - index of image to draw
//      g_rcImage - bounding rectangle of image
//      CX_IMAGE and CY_IMAGE - width and height of image extern int g_nImage;
extern RECT g_rcImage;

#define CX_IMAGE 32
#define CY_IMAGE 32

BOOL DrawTheImage(HWND hwnd, HIMAGELIST himl, int cx, int cy)
{
    HDC hdc;

if ((hdc = GetDC(hwnd)) == NULL)
        return FALSE;
    if (!ImageList_Draw(himl, g_nImage, hdc, cx, cy, ILD_TRANSPARENT))
        return FALSE;
    ReleaseDC(hwnd, hdc);

SetRect(&g_rcImage, cx, cy, CX_IMAGE + cx, CY_IMAGE + cy);

return TRUE;
}
```

Beginning the Drag Operation

The following function is intended to be called in response to a mouse button-down message, such as WM_LBUTTONDOWN. The function determines whether the user has clicked within the bounding rectangle of the image. If so, the function captures the mouse input, erases the image from the client area, and calculates the position for the hot spot within the image. The function sets the hot spot to coincide with the hot spot of the mouse cursor. Next, the function begins the drag operation by calling ImageList_StartDrag. Finally, the actual mouse cursor is hidden to prevent two mouse cursors from appearing on the display.

```
// StartDragging - begins dragging a bitmap.
```

77

```c
// Returns TRUE if successful or FALSE otherwise.
// hwnd - handle of the window in which the bitmap is dragged
// ptCur - coordinates of the cursor
// himl - handle of the image list
// Global variables
//      g-rcImage - bounding rectangle of the image to drag
//      g-nImage - index of the image
//      g-ptHotSpot - location of the image's hot spot extern RECT g_rcImage;
extern int g_nImage;
extern POINT g_ptHotSpot;

BOOL StartDragging(HWND hwnd, POINT ptCur, HIMAGELIST himl)
{
    // Return if the cursor is not in the bounding rectangle of
    // the image.
    if (!PtInRect(&g_rcImage, ptCur))
        return FALSE;

// Capture the mouse input.
    SetCapture(hwnd);

// Erase the image from the client area.
    InvalidateRect(hwnd, &g_rcImage, TRUE);
    UpdateWindow(hwnd);

// Calculate the location of the hot spot and save it.
    g_ptHotSpot.x = ptCur.x - g_rcImage.left;
    g_ptHotSpot.y = ptCur.y - g_rcImage.top;

// Begin the drag operation.
    if (!ImageList_StartDrag(himl, hwnd, g_nImage,
            ptCur.x, ptCur.y,
            g_ptHotSpot.x, g_ptHotSpot.y))
        return FALSE;

// Because the mouse cursor is combined with image, hide the
    // actual mouse cursor while dragging.
    ShowCursor(FALSE);

g_fDragging = TRUE;

return TRUE;
}
```

Moving the Image

The following function, which drags the image to a new location, is intended to be called in response to the WM_MOUSEMOVE message.

```
// MoveTheImage - drags an image to the specified coordinates.
// Returns TRUE if successful or FALSE otherwise.
// ptCur - new coordinates for the image BOOL MoveTheImage(POINT ptCur)
{
    if (!ImageList_DragMove(ptCur.x, ptCur.y))
        return FALSE;

return TRUE;
}
```

Ending the Drag Operation

The following function ends the drag operation and draws the image in its final location. It also releases the mouse capture and redisplays the mouse cursor.

```
// StopDragging - ends a drag operation and draws the image
//      at its final location.
// Returns TRUE if successful or FALSE otherwise.
// hwnd - handle of the window in which the bitmap is dragged
// himl - handle of the image list
// ptCur - coordinates of the cursor
//
// Global variable
// g_ptHotSpot-location of the image's hot spot extern POINT g_ptHotSpot;

BOOL StopDragging(HWND hwnd, HIMAGELIST himl, POINT ptCur)
{
        ImageList_EndDrag();

g_fDragging = FALSE;

DrawTheImage(hwnd, himl, ptCur.x - g_ptHotSpot.x,
            ptCur.y - g_ptHotSpot.y);

ReleaseCapture();
        ShowCursor(TRUE);

return TRUE;
}
```

Reference

The functions, structures, and macros used with image lists can be grouped as follows.

Creating Image Lists
ImageList_Create
ImageList_Destroy
ImageList_LoadBitmap

Adding and Removing Images
ImageList_Add
ImageList_AddMasked
ImageList_AddIcon
ImageList_AddFromImageList
ImageList_Remove

Replacing and Merging Images
ImageList_Replace
ImageList_ReplaceIcon
ImageList_Merge

Drawing Images
ImageList_Draw
ImageList_Draw2
ImageList_ExtractIcon
ImageList_GetBkColor
ImageList_SetBkColor
INDEXTOOVERLAYMASK

Dragging Images
ImageList_DragMove
ImageList_EndDrag
ImageList_SetOverlayImage
ImageList_StartDrag

Image Information
ImageList_GetImageCount
ImageList_GetImageInfo
ImageList_GetImageRect
IMAGEINFO

Functions

The following functions are used with image lists.

ImageList_Add

```
int WINAPI ImageList_Add(HIMAGELIST himl, HBITMAP hbmImage,
    HBITMAP hbmMask);
```

Adds an image or images to an image list.
- Returns the index of the first new image if successful or −1 otherwise.

*himl*
　　Handle of the image list.

*hbmImage*
　　Handle of the bitmap containing the image or images. The number of images is inferred from the width of the bitmap.

*hbmMask*
　　Handle of the bitmap containing the mask. If no mask is used with the image list, this parameter is ignored.

ImageList_AddFromImageList

80

```
int WINAPI ImageList_AddFromImageList(HIMAGELIST himlDest,
    HIMAGELIST himlSrc, int iSrc);
```

Adds an image contained in one image list to another image list.
- Returns the index of the new image if successful or −1 otherwise.

*himlDest*
    Handle of the destination image list.

*himlSrc* and *iSrc*
    Handle of the source image list, and the index of the image.

The source and destination must be different image lists, and images in both lists must be the same size.

ImageList_AddIcon

```
int  WINAPI ImageList_AddIcon(HIMAGELIST himl, HICON hicon);
```

Adds an image to an image list, using an icon.
- Returns the index of the new image if successful or −1 otherwise.

*himl*
    Handle of the image list. If this parameter identifies a masked image list, the function copies both the image and mask bitmaps of the icon. If this parameter identifies a nonmasked image list, the function copies only the image bitmap.

*hicon*
    Handle of the icon that contains the bitmap and mask for the new image.

Because the system does not save *hicon*, you can destroy it after the function returns.

ImageList_AddMasked

```
int WINAPI ImageList_AddMasked(HIMAGELIST himl, HBITMAP hbmImage,
    COLORREF crMask);
```

Adds an image or images to an image list, generating a mask from the given bitmap.
- Returns the index of the first new image if successful or −1 otherwise.

*himl*
    Handle of the image list.

*hbmImage*
    Handle of the bitmap containing the image or images. The number of images is inferred from the width of the bitmap.

81

*crMask*
    Color used to generate the mask. Each pixel of this color in the given bitmap is changed to black and the corresponding bit in the mask is set to one.

ImageList_Create

```
HIMAGELIST WINAPI ImageList_Create(int cx, int cy, BOOL fMask,
    int cInitial, int cGrow);
```

Creates a new image list.
- Returns the handle of the image list if successful or NULL otherwise.

*cx* and *cy*
    Dimensions of each image, in pixels.

*fMask*
    Flag specifying whether to create a masked image list. If this parameter is TRUE, the image list contains two bitmaps, one of which is a monochrome bitmap used as a mask. If this parameter is FALSE, the image list contains only one bitmap.

*cInitial*
    Number of images that the image list initially contains.

*cGrow*
    Amount of images by which the image list can grow when the system needs to resize the list to make room for new images. This parameter represents the number of new images the resized image list can contain.

ImageList_Destroy

```
BOOL WINAPI ImageList_Destroy(HIMAGELIST himl);
```

Destroys an image list.
- Returns TRUE if successful or FALSE otherwise.

*himl*
    Handle of the image list to destroy.

ImageList_DragMove

```
BOOL WINAPI ImageList_DragMove(int x, int y);
```

Moves the image that is being dragged during a drag-and-drop operation. This function is typically called in response to a WM_MOUSEMOVE message.
- Returns TRUE if successful or FALSE otherwise.

82

*x* and *y*
: New drag position.

To begin a drag operation, use the ImageList_StartDrag function.

ImageList_Draw

```
BOOL WINAPI ImageList_Draw(HIMAGELIST himl, int i, HDC hdcDst,
    int x, int y, UINT fStyle);
```

Draws an image list item in the specified device context (DC).
- Returns TRUE if successful or FALSE otherwise.

*himl* and *i*
: Handle of the image list, and the index of the image to draw.

*hdcDst*
: Handle of the destination DC.

*x* and *y*
: Location at which to draw within the specified DC.

*fStyle*
: Flag specifying the drawing style. It can be one or more of these values:

| | |
|---|---|
| ILD_NORMAL | Draws the image using the background color for the image list. If the background color is the CLR_NONE value, the image is drawn transparently using the mask. |
| ILD_TRANSPARENT | Draws the image transparently using the mask, regardless of the background color. This value has no effect if the image list does not contain a mask. |
| ILD_BLEND50 | Draws the image dithered with the highlight color to indicate that it is selected. This value has no effect if the image list does not contain a mask. |
| ILD_BLEND25 | Draws the image striped with the highlight color to indicate that it has the focus. |
| ILD_OVERLAYMASK | Draws the image and overlays it with an overlay mask. The index of the overlay mask must be combined with this style. The index must also be specified by using the INDEXTOOVERLAYMASK macro. |

ImageList_Draw2

```
BOOL WINAPI ImageList_Draw2(HIMAGELIST himl, int i, HDC hdcDst,
    int x, int y, COLORREF rgb, UINT fStyle);
```

Draws an image list item in the given device context (DC). The function uses the specified drawing style and blends the image with the specified color.

83

- Returns TRUE if successful or FALSE otherwise.

*himl* and *i*
    Handle of the image list, and the index of the image to draw.

*hdcDst*
    Handle of the destination DC.

*x* and *y*
    Location at which to draw within the specified DC.

*rgb*
    Blend color for the image. It can be an application-defined RGB value or one of the following values:

| | |
|---|---|
| CLR_NONE | No blend color. The image is blended with the color of the destination DC. |
| CLR_DEFAULT | Default background color. |
| CLR_HIGHLIGHT | System-defined highlight color. |

*fStyle*
    Flag specifying the drawing style. It can be one or more of these values:

| | |
|---|---|
| ILD_BLEND25 | Draws the image, blending 25 percent with the blend color specified by *rgb*. This value has no effect if the image list does not contain a mask. |
| ILD_BLEND50 | Draws the image, blending 50 percent with the blend color specified by *rgb*. This value has no effect if the image list does not contain a mask. |
| ILD_BLEND75 | Draws the image, blending 75 percent with the blend color specified by *rgb*. This value has no effect if the image list does not contain a mask. |
| ILD_NORMAL | Draws the image using the background color for the image list. If the background color is the CLR_NONE value, the image is drawn transparently using the mask. |
| ILD_TRANSPARENT | Draws the image transparently using the mask, regardless of the background color. This value has no effect if the image list does not contain a mask. |
| ILD_SELECTED | Same as ILD_BLEND50. |
| ILD_FOCUS | Same as ILD_BLEND25. |
| ILD_OVERLAYMASK | Draws the image and overlays it with an overlay mask. The index of the overlay mask must be combined with this style. The index must also be specified by using the INDEXTOOVERLAYMASK macro. |

ImageList_EndDrag

```
HIMAGELIST WINAPI ImageList_EndDrag(VOID);
```

84

Ends a drag operation.
- Returns the handle of the temporary image list that is used for dragging if successful or NULL otherwise.

Because this function destroys the temporary image list, the handle returned by this function is invalid. To begin a drag operation, use the ImageList_StartDrag function.

ImageList_ExtractIcon

```
HICON WINAPI ImageList_ExtractIcon(HINSTANCE hAppInst,
    HIMAGELIST himl, int i);
```

Creates an icon based on an image and mask in an image list.
- Returns the handle of the icon if successful or NULL otherwise.

*hAppInst*
    Handle of the application instance that will own the icon.
*himl* and *i*
    Handle of the image list, and the index of the image.

ImageList_GetBkColor

```
COLORREF WINAPI ImageList_GetBkColor(HIMAGELIST himl);
```

Retrieves the current background color for an image list.
- Returns the background color.

*himl*
    Handle of the image list.

ImageList_GetImageCount

```
int WINAPI ImageList_GetImageCount(HIMAGELIST himl);
```

Retrieves the number of images in an image list.
- Returns the number of images.

*himl*
    Handle of the image list.

ImageList_GetImageInfo

```
BOOL WINAPI ImageList_GetImageInfo(HIMAGELIST himl, int i,
    IMAGEINFO FAR* pImageInfo);
```

Retrieves information about an image.
- Returns TRUE if successful or FALSE otherwise.

*himl* and *i*
    Handle of the image list, and the index of the image.

*pImageInfo*
    Address of an IMAGEINFO structure that receives information about the image. The information in this structure can be used to directly manipulate the bitmaps for the image.

ImageList_GetImageRect

```
BOOL WINAPI ImageList_GetImageRect(HIMAGELIST himl, int i,
    RECT FAR* prcImage);
```

Retrieves the bounding rectangle of image in an image list's bitmaps.
- Returns TRUE if successful or FALSE otherwise.

*himl* and *i*
    Handle of the image list, and the index of the image.

*prcImage*
    Address of a RECT structure that receives the bounding rectangle.

ImageList_LoadBitmap

```
HIMAGELIST WINAPI ImageList_LoadBitmap(HINSTANCE hi, LPCSTR lpbmp,
    int cx, int cGrow, COLORREF crMask);
```

Creates an image list from the given bitmap resource.
- Returns the handle of the image list if successful or NULL otherwise.

*hi* and *lpbmp*
    Handle of the instance containing the bitmap resource, and the name of the resource.

*cx*
    Width of each image. The height of each image and the initial number of images are inferred by the dimensions of the given bitmap.

*cGrow*
    Amount of images by which the image list can grow when the system needs to resize the list to make room for new images. This parameter represents the number of new images the resized image list can contain.

*crMask*
    Color used to generate a mask. Each pixel of this color in the given bitmap is changed to black, and the corresponding bit in the mask is set to one. If this parameter is the CLR_NONE value, no mask is generated.

ImageList_Merge

```
HIMAGELIST WINAPI ImageList_Merge(HIMAGELIST himl1, int i1,
    HIMAGELIST himl2, int i2, int dx, int dy);
```

Creates a new image by combining two existing images. The function also creates a new image list to store the image.
- Returns the handle of the new image list if successful or NULL otherwise.

*himl1* and *i1*
    Handle of the first image list, and the index of the first existing image.

*himl2* and *i2*
    Handle of the second image list, and the index of the second existing image.

*dx* and *dy*
    Offset of the second image relative to the first image.

The new image consists of the second existing image drawn transparently over the first. The mask for the new image is the result of performing a logical OR operation on the masks of the two existing images.

ImageList_Read

```
HIMAGLIST WINAPI ImageList_Read(LPSTREAM lpstm);
```

Reads an image list from a stream.
- Returns the handle of the image list if successful or NULL otherwise.

*lpstm*
    Address of the stream.

ImageList_Remove

```
BOOL WINAPI ImageList_Remove(HIMAGELIST himl, int i);
```

Removes an image from an image list.
- Returns TRUE if successful or FALSE otherwise.

*himl* and *i*
    Handle of the image list, and the index of the image to remove.

87

ImageList_Replace

```
BOOL WINAPI ImageList_Replace(HIMAGELIST himl, int i,
    HBITMAP hbmImage, HBITMAP hbmMask);
```

Replaces an image in an image list with a new image.
- Returns TRUE if successful or FALSE otherwise.

*himl* and *i*
   Handle of the image list, and the index of the image to replace.

*hbmImage*
   Handle of the bitmap containing the image.

*hbmMask*
   Handle of the bitmap containing the mask. If no mask is used with the image list, this parameter is ignored.

ImageList_ReplaceIcon

```
int WINAPI ImageList_ReplaceIcon(HIMAGELIST himl, int i, HICON hicon);
```

Replaces an image in an image list, using an icon.
- Returns the index of the image if successful or −1 otherwise.

*himl* and *i*
   Handle of the image list, and the index of the image to replace.

*hicon*
   Handle of the icon that contains the bitmap and mask for the new image.

ImageList_SetBkColor

```
COLORREF WINAPI ImageList_SetBkColor(HIMAGELIST himl,
    COLORREF clrBk);
```

Sets the background color for an image list.
- Returns the previous background color if successful or the CLR_NONE value otherwise.

*himl*
   Handle of the image list.

*clrBk*
   Background color to set. It can be CLR_NONE, and in that case images are drawn transparently using the mask.

ImageList_SetOverlayImage

```
BOOL WINAPI ImageList_SetOverlayImage(HIMAGELIST himl, int iImage,
    int iOverlay);
```

Adds the index of an image to the list of images to be used as overlay masks. Up to four indices can be added to the list.
- Returns TRUE if successful or FALSE otherwise.

*himl* and *iImage*
    Handle of the image list, and the index of the image to use as an overlay mask.
*iOverlay*
    One-based index of the overlay mask.

An overlay mask is an image drawn transparently over another image. You draw an overlay mask over an image by using the ImageList_Draw or ImageList_Draw2 function with the ILD_OVERLAYMASK style combined with the index of the overlay mask. The index must be specified by using the INDEXTOOVERLAYMASK macro.

ImageList_StartDrag

```
BOOL WINAPI ImageList_StartDrag(HIMAGELIST himl, HWND hwndLock, int i,
    int x, int y, int dxHotspot, int dyHotspot);
```

Begins dragging an image.
- Returns TRUE if successful or FALSE otherwise.

*himl* and *i*
    Handle of the image list, and the index of the image to drag.
*hwndLock*
    Handle of the window in which the dragged image is drawn. The dragged image is clipped to the given window. If this parameter is NULL, the dragged image can be drawn anywhere on the display.
*x* and *y*
    Coordinates of the starting drag position (typically, the cursor position). The coordinates are relative to the upper left corner of the window identified by *hwndLock*. If *hwndLock* is NULL, the coordinates are relative to the upper left corner of the display.
*dxHotSpot* and *dyHotSpot*
    Location of the drag position relative to the upper left corner of the image.

This function creates a temporary image list that is used for dragging. The image combines the specified image and its mask with the current cursor. In response to subsequent WM_MOUSEMOVE messages, you can move the drag image by using the ImageList_DragMove function. To end the drag operation, you can use the ImageList_EndDrag function.

ImageList_Write

```
HIMAGLIST WINAPI ImageList_Read(HIMAGELIST himl, LPSTREAM lpstm);
```

Writes an image list to a stream.
- Returns TRUE if successful or FALSE otherwise.

*himl*
    Handle of the image list.

*lpstm*
    Address of the stream.

Structure

The following structure is used with image lists.

IMAGEINFO

```
typedef struct _IMAGEINFO {
    HBITMAP hbmImage;       // bitmap containing the images
    HBITMAP hbmMask;        // see below
    int     cPlanes;        // number of color planes in hbmImage
    int     cBitsPerPixel;  // bits per pixel in hbmImage
    RECT    rcImage;        // see below
} IMAGEINFO;
```

Contains information about an image in an image list. This structure is used with the ImageList_GetImageInfo function.

hbmMask
    Handle of a monochrome bitmap containing the masks for the images. If the image list does not contain a mask, this member is NULL.

rcImage
    Bounding rectangle of the image within the bitmap specified by hbmImage.

Macro

The following macro is used with image lists.

INDEXTOOVERLAYMASK

```
UINT INDEXTOOVERLAYMASK(UINT i)
```

Prepares the index of an overlay mask so that the ImageList_Draw function can use it.

We claim:

1. In a computer system having a display, an input device, and a processor running an operating system (OS) and an application program, the application program running in an application window having a client area, the client area for displaying and manipulating application data, a method comprising:
   (a) outputting a control window to the display, the control window being associated with the application program;
   (b) predefining, by the OS, a tab control class for providing information to the application program, wherein:
      (i) the tab control class includes a plurality of tab control images, each tab control image defining a page having a tab; and
      (ii) each page displays application parameters from the application program;
   (c) instantiating, by the application program, the tab control class; and
   (d) outputting, to the display, a first tab control image superimposed on top of other tab control images within the window, such that the first tab control image, any application parameters thereof, and the tabs of the other tab control images are viewable in the control window.

2. The method of claim 1, further comprising:
   (e) selecting, by the input device, a tab of a tab control image other than the first tab control image; and
   (f) outputting, to the display, a second tab control image superimposed on top of the first tab control image within the window, the second tab control image defining a page having the selected tab, such that the second tab control image, any second content, the tab of the first tab control image, and the tabs of other tab control images are viewable in the window.

3. The method of claim 1, wherein the content comprises a set of properties for modifying functionality of the application program.

4. The method of claim 1, further comprising displaying a graphical image in a tab.

5. The method of claim 4, wherein the tab in which the graphical image which is displayed is provided by the application program.

6. In a computer system having a display, an input device, and a processor running an operating system (OS) and an application program, the application program running in an application window having a client area, the client area for displaying and manipulating application data, a method comprising:
   (a) outputting a control window to the display, the control window being associated with the application program,
   (b) predefining, as part of the OS, an application program interface (API) for creating a tab control for providing information to the application program wherein:
      (i) the API defines a plurality of tab control images, each tab control image defining a page having a tab; and
      (ii) each page displays application parameters from the application program;
   (c) issuing, by the application program, a function call to the API to create a tab control; and
   (d) outputting, to the display, a first tab control image superimposed on top of other tab control images within the control window, such that the first tab control image, any application parameters thereof, and the tabs of the other tab control images are viewable in the window.

7. The method of claim 6, wherein the function call includes information specifying a number of tab control images to be created by the API and output to the display.

8. The method of claim 6, further comprising:
   (e) selecting, by the input device, a tab of a tab control image other than the first tab control image; and
   (f) outputting, to the display, a second tab control image superimposed on top of the first tab control image within the window, the second tab control image defining a page having the selected tab, such that the second tab control image, any second content, the tab of the first tab control image, and the tabs of other tab control images are viewable in the window.

9. The method of claim 6, wherein the content comprises a set of properties for modifying functionality of the application program.

10. The method of claim 6, further comprising displaying a graphical image in a tab.

11. The method of claim 10, wherein the tab in which the graphical image which is displayed is provided by the application program.

12. A computer-readable medium for use in a computer system having a display, an input device, and a processor running an operating system (OS) and an application program, the application program running in an application window having a client area, the client area for displaying and manipulating application data, the computer-readable medium having computer-executable instructions for performing the steps of:
   (a) outputting a control window to the display, the control window being associated with the application program
   (b) predefining, by the OS, a tab control class for providing information to the application prom wherein:
      (i) the tab control class includes a plurality of tab control images, each tab control image defining a page having a tab; and
      (ii) each page displays application parameters from the application program;
   (c) instantiating by the application program, the tab control class to create a tab control; and
   (d) outputting, to the display, a first tab control image superimposed on top of other tab control images within the control window, such that the first tab control image, any application parameters thereof, and the tabs of the other tab control images are viewable in the window.

13. A method of transferring a computer program product from one or more first computers to a second computer connected to the one or more first computers through a communications medium, comprising:
   (a) accessing, on the first computer, computer-executable instructions which, when run on a data processing system having an operating system with a shell that provides functionality, an application program installed under the operating system, and a class of objects related to tie application program, said class of objects having an associated object class identifier, perform the steps of:
      (1) outputting a control window to the display, the control window being associated with the application program;
      (2) predefining, by the OS, a tab control class for providing information to the application program, wherein:
         (i) the tab control class includes a plurality of tab control images, each tab control mage defining a page having a tab; and (ii) each page displays application parameters from the application program;
(3) instantiating, by the application program, the tab control class; and
(4) outputting to the display, a first tab control image superimposed on top of other tab control images within the control window, such that the first tab control image, any application parameters thereof, and the tabs of the other tab control images are viewable in the window, and (b) transferring the computer-executable instructions from the one or more first computers to the second computer through the communications medium.

* * * * *

UNITED STATES PATENT AND TRADEMARK OFFICE
CERTIFICATE OF CORRECTION

PATENT NO. : 5,889,522
DATED : March 30, 1999
INVENTOR(S) : C.H. Chew et al.

Page 1 of 3

It is certified that error appears in the above-identified patent and that said Letters Patent is hereby corrected as shown below:

| COLUMN | LINE | |
|---|---|---|
| Title page, col. 2 | Attorney, Agent, or Firm | "O'Conner" should read --O'Connor-- |
| 4 | 14 | Before "achieved" insert --is-- |
| 4 | 35 | "field in the structure contain" should read --fields in the structure contain-- |
| 4 | 48 | "psztext" should read --pszText-- |
| 4 | 67 | "show" should read --shown-- |
| 5 | 42 | Before "deleted" insert --be-- |
| 8 | 1 | Before "analogous" insert --are-- |
| 9 (text "TCS_ | 13 corresponding to FORCELABELLEFT") | "fixed width" should read --fixed-width-- |
| 11 | 26 | "print" should read --draw-- |
| 11 | 27 | "paint" should read --draw-- |

UNITED STATES PATENT AND TRADEMARK OFFICE
CERTIFICATE OF CORRECTION

PATENT NO. : 5,889,522
DATED : March 30, 1999
INVENTOR(S) : C.H. Chew et al.

It is certified that error appears in the above-identified patent and that said Letters Patent is hereby corrected as shown below:

| COLUMN | LINE | |
|---|---|---|
| 11 | 48-49 | "rect-angle" should be hyphenated --rec-tangle-- |
| 13 | 23 | "replace" should read --replaced-- |
| 147 (Claim 6, line 8) | 51 | After "program" delete "," and insert therefor --;-- |
| 147 (Claim 6, line 11) | 54 | After "program" insert --,-- |
| 148 (Claim 12, line 10) | 31 | After "program" insert --;-- |
| 148 (Claim 12, line 12) | 33 | "prom" should read --program,-- |
| 148 (Claim 12, line 18) | 39 | After "instantiating" insert --,-- |
| 148 (Claim 13, line 10) | 56 | "tie" should read --the-- |

UNITED STATES PATENT AND TRADEMARK OFFICE
CERTIFICATE OF CORRECTION

PATENT NO. : 5,889,522
DATED : March 30, 1999
INVENTOR(S) : C.H. Chew et al.

It is certified that error appears in the above-identified patent and that said Letters Patent is hereby corrected as shown below:

| COLUMN | LINE | |
|---|---|---|
| 148 (Claim 13, line 20) | 66 | "mage" should read --image-- |
| 149 (Claim 13, line 26) | 5 | After "outputting" insert --,-- |
| 150 (Claim 13, line 31) | 2 | After "window" delete "," and insert therefor --;-- |

Signed and Sealed this

Eleventh Day of January, 2000

Attest:

Q. TODD DICKINSON

Attesting Officer

Acting Commissioner of Patents and Trademarks